（12） United States Patent
Ogata et al.

(10) Patent No.: US 6,383,407 B2
(45) Date of Patent: *May 7, 2002

(54) BONDED MAGNET, MAGNET ROLL, A FERRITE POWDER USED THEREFOR AND METHOD FOR PRODUCING SAME

(75) Inventors: Yasunobu Ogata; Yutaka Kubota; Takashi Takami; Shuichi Shiina, all of Saitama-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/784,046

(22) Filed: Feb. 16, 2001

Related U.S. Application Data

(63) Continuation of application No. 09/381,697, filed as application No. PCT/JP99/00274 on Jan. 25, 1999, now Pat. No. 6,284,150.

(30) Foreign Application Priority Data

Jan. 23, 1998 (JP) ............................................. 10-011453

(51) Int. Cl.$^7$ ........................... C04B 35/40; C04B 35/35
(52) U.S. Cl. .............................. 252/62.63; 252/62.57; 252/62.54; 322/51; 492/8
(58) Field of Search ................ 252/62.63, 62.57, 252/62.54; 322/51; 492/8

(56) References Cited

U.S. PATENT DOCUMENTS 5,958,284 A * 9/1999 Takami et al. ............ 252/62.63
6,086,781 A * 7/2000 Taguchi et al. ........... 252/62.62
6,139,766 A * 10/2000 Taguchi et al. ........... 252/62.57

FOREIGN PATENT DOCUMENTS

| EP | 0 758 786 | 2/1997 |
| JP | 9-115715 | 5/1997 |
| WO | WO98/38654 | 9/1998 |
| WO | WO99/16087 | 4/1999 |

* cited by examiner

*Primary Examiner*—C. Melissa Koslow
(74) *Attorney, Agent, or Firm*—Sughrue Mion, PLLC

(57) ABSTRACT

A ferrite powder for bonded magnets having a substantially magnetoplumbite-type crystal structure and an average diameter of 0.9–2 μm, the ferrite powder having a basic composition represented by the following general formula: $(A_{1-x}R_x)O \cdot n[(Fe_{1-y}M_y)_2O_3]$ by atomic ratio, wherein A is Sr and/or Ba; R is at least one of rare earth elements including Y, La being indispensable; M is at least one element selected from the group consisting of Co, Mn, Ni and Zn; and x, y and n are numbers meeting the conditions of $0.01 \leq x \leq 0.4$, $[x/(2.6n)] \leq y \leq [x/(1.6n)]$, and $5 \leq n \leq 6$, (Si+Ca) being 0.2 weight % or less, and (Al+Cr) being 0.13 weight % or less, can be produced by mixing iron oxide containing 0.06 weight % or less of (Si+Ca) and 0.1 weight % or less of (Al+Cr) with compounds of A, R and M elements, calcining the resultant mixture for ferritization, pulverizing the resultant magnetically isotropic ferrite and then heat-treating the pulverized ferrite at 750–950° C. for 0.5–3 hours in the air.

14 Claims, 8 Drawing Sheets

BONDED MAGNET, MAGNET ROLL, A FERRITE POWDER USED THEREFOR AND METHOD FOR PRODUCING SAME

This is a continuation of application Ser. No. 09/381,697 Sep. 23, 1999, now U.S. Pat. No. 6,284,150, which is a National Stage application of PCT International Application No. PCT/JP99/00274, filed Jan. 25, 1999, the disclosures of which are incorporated herein by reference.

FIELD OF THE INVENTION

The present invention relates to a high-performance bonded magnet useful for wide ranges of magnet applications such as various rotors, magnet rolls for electromagnetic developing-type printers and photocopiers, audio speakers, buzzers, attracting or magnetic field-generating magnets and having a higher residual magnetic flux density Br (or higher residual magnetic flux density Br and coercivity iHc) than those of the conventional Sr and/or Ba ferrite powders, and a ferrite powder used therefor and a method for producing such a bonded magnet and a ferrite powder, more particularly to a magnet roll composed of such a high-performance bonded magnet and a method for producing such a magnet roll.

BACKGROUND OF THE INVENTION

As well known, bonded magnets are lighter in weight and higher in dimensional accuracy than sintered magnets and suitable for mass production of articles having complicated shapes, and therefore they are widely used for various magnet applications. Recently, magnet-applied products have been drastically miniaturized and reduced in weight, requiring high-performance ferrite bonded magnets having a higher Br (or higher Br and iHc) suitable for miniaturization and reduction in weight.

Conventional Sr and/or Ba ferrite bonded magnets are obtained by bonding Sr and/or Ba ferrite powder having a composition represented by $AO.nFe_2O_3$, wherein A is Sr and/or Ba, and n=5–6, with binders such as thermoplastic polyolefin resins or rubbers, advantageous in low cost. However, the ferrite bonded magnets are lower in Br and maximum energy product $(BH)_{max}$ than sintered ferrite magnets to the extent of volume increase due to non-magnetic portions occupied by binders. To obviate this disadvantage, various attempts have been made conventionally to improve the orientation of a ferrite powder by a magnetic field or a mechanical stress applied for a ferrite powder orientation, and to improve the filling of a ferrite powder in binders. As a result, it is almost considered that no further improvement in magnetic properties would be able to be achieved in bonded magnets comprising a ferrite powders having conventional compositions.

If the filling ratio of a ferrite powder in rubbers or plastics is increased to improve the magnetic properties of bonded magnets, the resultant blends would have extremely high melt viscosity. Even though high-melt viscosity blends are subjected to practical orientating magnetic field or mechanical stress, it would be difficult to obtain bonded magnets having well-oriented ferrite powder. This difficulty is remarkable in an injection molding method, though it is appreciable in an extrusion method and a compression molding method, too. Though the orientation of a ferrite powder in the ferrite bonded magnets is improved by increasing the filling ratio of a ferrite powder in rubbers or plastics, such improvement inevitably causes the deterioration of magnetic properties, failing to satisfy the demand of miniaturization and reduction in weight.

To obviate such problems of conventional technology, it is effective to improve the saturation magnetization σs or crystal magnetic anisotropy constant of a ferrite powder for bonded magnets. Improvement in σs directly leads to improvement in coercivity Hc (or iHc). Incidentally, the conventional a ferrite powder for bonded magnets having a composition of $AO.nFe_2O_3$ has a magnetoplumbite-type crystal structure, and W-type ferrite having larger σs than a ferrite powder having a magnetoplumbite-type crystal structure has also been investigated. However, the mass production of the W-type ferrite cannot be materialized so far due to difficulty in the control of a sintering atmosphere.

Japanese Patent Laid-Open No. 9-115715 discloses a ferrite powder for bonded magnets having a main phase constituted by a hexagonal magnetoplumbite-type ferrite represented by the general formula: $A_{1-x}R_x(Fe_{12-y}M_y)_zO_{19}$, wherein A is at least one element selected from the group consisting of Sr, Ba, Ca and Rb, R is at least one of rare earth elements including Y, La being indispensable, M is Zn and/or Cd, and x, y and z are molar ratios meeting the conditions of $0.04 \leq x \leq 0.45$, $0.04 \leq y \leq 0.45$, and $0.7 \leq z \leq 1.2$. Investigation by the inventors has revealed, however, that it is difficult to obtain bonded magnets having high Br and iHc (for instance, exceeding 3.5 kOe) from this a ferrite powder for bonded magnets.

Accordingly, an object of the present invention is to provide a high-performance bonded magnet having a magnetoplumbite-type crystal structure suitable for mass production, which has higher Br (or higher Br and iHc) than those of conventional Sr and/or Ba ferrite bonded magnets, a magnet roll composed of such a bonded magnet, a ferrite powder used for such a bonded magnet, and methods for producing them.

DESCRIPTION OF THE INVENTION

The inventors have paid attention to the fact that by adding metal compounds (for instance, a combination of a La oxide and at least one oxide of Co, Mn, Ni and Zn, or a combination of a rare earth oxide mixture based on a La oxide as a main component and containing oxides of Nd, Pr, Ce, etc. and an oxide of Co and/or Zn), which have not been conventionally tried, to ferrite represented by $AO.nFe_2O_3$, wherein A is Sr and/or Ba, and n is 5–6, part of A and Fe elements in the above ferrite can be substituted by the metal elements in the metal compounds added, resulting in a ferrite powder suitable for bonded magnets, which has a magnetoplumbite-type crystal structure with a higher saturation magnetization and coercivity than those of conventional Sr and/or Ba ferrite powder.

The magnetism of this magnetoplumbite-type a ferrite powder is derived from a magnetic moment of Fe ions, with a magnetic structure of a ferri-magnet in which magnetic moment is arranged partially in antiparallel by Fe ion sites. There are two methods to improve the saturation magnetization in this magnetic structure. The first method is to replace the Fe ions at sites corresponding to the antiparallel-oriented magnetic moment with another element, which has a smaller magnetic moment than Fe ions or is non-magnetic. The second method is to replace the Fe ions at sites corresponding to the parallel-oriented magnetic moment with another element having a larger magnetic moment than Fe ions.

Also, increase in a crystal magnetic anisotropy constant in the above magnetic structure can be achieved by replacing Fe ions with another element having a stronger interaction with the crystal lattice. Specifically, Fe ions are replaced with an element in which a magnetic moment derived from an orbital angular momentum remains or is large.

With the above findings in mind, research has been conducted for the purpose of replacing Fe ions with various elements by adding various metal compounds such as metal oxides. As a result, it has been found that Mn, Co and Ni are elements remarkably improving magnetic properties.

However, the mere addition of the above elements would not provide a ferrite powders with fully improved magnetic properties, because the replacement of Fe ions with other elements would destroy the balance of ion valance, resulting in the generation of undesirable phases. To avoid this phenomenon, ion sites of Sr and/or Ba should be replaced with other elements for the purpose of charge compensation. For this purpose, the addition of at least one of La, Nd, Pr, Ce, etc., particularly La, is effective. That is, it has been found that a ferrite powder produced by the addition of an R element compound based on La and an M element compound (at least one of Co, Mn, Ni and Zn) provides bonded magnets having higher Br (or higher Br and iHc) than those of the conventional Sr and/or Ba ferrite bonded magnets. It has also been found that bonded magnets formed by using a ferrite powder produced by the addition of an R element compound based on La and a Co element compound and/or a Zn compound has well-balanced Br and iHc, particularly suitable for magnet rolls.

Further investigation of the inventors has revealed that sufficient improvement in the magnetic properties of bonded magnets cannot be obtained only by selecting the composition of main components for ferrite. This is because the magnetic properties of bonded magnets containing a ferrite powder are largely affected not only by the basic composition of a ferrite powder but also by the amounts of impurities (particularly Si, Ca, Al, Cr) in the ferrite powder.

In general, when magnetically isotropic ferrite obtained by a ferritization reaction is pulverized to fine particles having particle sizes substantially corresponding to the single magnetic domain size and then heat-treated, the resultant a ferrite powder for bonded magnets has improved magnetic properties. Investigation of the inventors has also revealed that to achieve as high Br as corresponding to a Br potential inherent in a ferrite powder materials adjusted to have the above basic composition, the amounts of additives for forming crystal grain boundary phases such as $SiO_2$, CaO, etc., useful for sintered a ferrite powders, and $Al_2O_3$ and/or $Cr_2O_3$ having a function to largely improve iHc though remarkably decreasing Br should be made as small as possible.

The first factor affecting the amounts of inevitable impurities in ferrite powder is the purity of iron oxide. Iron oxide, which is a main component for the ferrite powder, inevitably contains inevitable impurities such as $SiO_2$, $Al_2O_3$, $Cr_2O_3$, etc. Though the amounts of these inevitable impurities are preferably as small as possible, the used of iron oxide having higher purity than necessary for industrial production disadvantageously leads to increase in production cost. Incidentally, other starting materials than iron oxide are preferably $SrCO_3$, $La_2O_3$, Co oxides, etc. having a purity of 99% or more.

The second factor affecting the amounts of inevitable impurities in ferrite powder is Si, Cr, Al, etc., which may enter into the ferrite powder in the course of fine pulverization of a magnetically anisotropic ferrite composition obtained by a ferritization reaction to a single magnetic domain size or a particle size corresponding thereto. As a result of investigation by the inventors, it has been appreciated that the amounts of inevitable impurities tend to increase in the case of using a ball-milling pot or balls made of steel, which are in general widely used in the production of ferrite powder. It has been found that particularly when fine pulverization is carried out to an average diameter of about 1.3 µm or less measured by an air permeation method using a Fischer Subsieve sizer, portions in contact with the ferrite powder, such as steel balls (pulverization medium), inner walls of pulverizing chambers, etc., are extremely worn, resulting in Si, Cr and Al components entering into the ferrite powder. The extent of contamination is remarkable when the average diameter of pulverized powder is as small as 1.1 µm or less.

From the aspect of commercial production, it is preferable to use usual pulverizing machines such as attritors, ball mills, vibration ball mills, etc., and also steel balls that less affect the magnetic properties of ferrite powder than ceramic balls when worn pulverization media contaminate the ferrite powder. Accordingly, it has been found to be necessary to select a type of steel that does not substantially contain Al as a material for the inner walls of pulverization chambers, pulverization media, etc., to prevent Al and other inevitable impurities from entering into the ferrite powder during a pulverization process.

However, because the inclusion of Si and Cr components into the ferrite powder during pulverization is unavoidable due to limitations in commercial production, the permissible amounts of Si, etc. contained in the ferrite powder and the amounts of Si, etc. entering into the ferrite powder during pulverization have been taken into consideration to achieve the following findings: When iron oxide used for ferrite powder for bonded magnets has a total content of Si and Ca calculated as ($SiO_2$+CaO) is 0.06 weight % or less and a total content of Al and Cr calculated as ($Al_2O_3$+$Cr_2O_3$) is 0.1 weight % or less, the resultant ferrite powder contains impurities in such amounts that a total of a Si content calculated as $SiO_2$ and a Ca content calculated as CaO is 0.2 weight % or less, and a total of an Al content $Al_2O_3$ and a Cr content calculated as $Cr_2O_3$ is 0.13 weight % or less, resulting in higher Br than that of the conventional ferrite powder. The present invention has been completed based on this finding.

Thus, the ferrite powder for bonded magnets according to the present invention has a substantially magnetoplumbite-type crystal structure and an average diameter of 0.9–2 µm, the ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one of rare earth elements including Y, La being indispensable; M is at least one element selected from the group consisting of Co, Mn, Ni and Zn; and x, y and n are numbers meeting the following conditions:

$0.01 \leq x \leq 0.4$, $[x/(2.6n)] \leq y \leq [x/(1.6n)]$, and $5 \leq n \leq 6$, a total of an Si content (calculated as $SiO_2$) and a Ca content (calculated as CaO) being 0.2 weight % or less, and a total of an Al content (calculated as $Al_2O_3$) and a Cr content (calculated as $Cr_2O_3$) being 0.13 weight % or less.

The method for producing a ferrite powder for bonded magnets according to the present invention comprises the steps of preparing a magnetically isotropic ferrite composition having the above basic composition; finely pulverizing the ferrite composition; and heat-treating the pulverized ferrite powder at 750–950° C. for 0.5–3 hours in the air.

It is preferred that the magnetically isotropic ferrite composition is prepared by mixing an iron oxide with a compound containing an A element, a compound containing an R element and a compound containing an M element and then calcining the resultant mixture for a solid-state reaction, and that the magnetically isotropic ferrite composition is subjected to dry-pulverization to an average diameter, heat treatment, immersion in water for disintegration, and then drying. Further, iron oxide obtained by spray-roasting a waste liquid generated by washing steel with hydrochloric acid is preferably used as the iron oxide.

The total of a Si content (calculated as $SiO_2$) and a Ca content (calculated as CaO) is preferably 0.15 weight % or less, and the total of an Al content (calculated as $Al_2O_3$) and a Cr content (calculated as $Cr_2O_3$) is preferably 0.1 weight % or less in the ferrite powder.

The anisotropic granulated powder for bonded magnets constituted by an aggregate of ferrite powder having a substantially magnetoplumbite-type crystal structure and an average diameter of 0.9–2 μm, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one of rare earth elements including Y, La being indispensable; M is at least one element selected from the group consisting of Co, Mn, Ni and Zn; and x, y and n are numbers meeting the following conditions:

$0.01 \leq x \leq 0.4$, $[x/(2.6n)] \leq y \leq [x/(1.6n)]$, and $5 \leq n \leq 6$, the anisotropic granulated powder having an average diameter of more than 2 μm and 10 μm or less, and a total of an Si content (calculated as $SiO_2$) and a Ca content (calculated as CaO) being 0.2 weight % or less, and a total of an Al content (calculated as $Al_2O_3$) and a Cr content (calculated as $Cr_2O_3$) being 0.13 weight % or less.

The method for producing an anisotropic granulated powder for bonded magnets according to the present invention comprises the steps of calcining a starting material mixture having the above basic composition for ferritization to form magnetically isotropic ferrite, which is pulverized, molded in a magnetic field, disintegrated to an average diameter of more than 2 μm and 10 μm or less, and then heat-treated at 750–950° C. for 0.5–3 hours in the air.

The bonded magnet according to the present invention comprises the above ferrite powder or the above anisotropic granulated powder and a binder, having radial or polar anisotropy.

The magnet roll according to the present invention has a plurality of magnetic poles on a surface thereof, at least one magnetic pole portion thereof being constituted by a bonded magnet composed of 85–95 weight % of ferrite powder and 15–5 weight % of a binder, the ferrite powder having a substantially magnetoplumbite-type crystal structure, an average diameter of 0.9–2 μm, and a basic composition represented by the following general formula:

$(A_{1-x}R_x)O \cdot n[(Fe_{1-y}M_y)_2O_3]$ by atomic ratio, wherein A is Sr and/or Ba; R is at least one of rare earth elements including Y, La being indispensable; M is at least one element selected from the group consisting of Co and/or Zn; and x, y and n are numbers meeting the following conditions:

$0.01 \leq x \leq 0.4$, $[x/(2.6n)] \leq y \leq [x/(1.6n)]$, and $5 \leq n \leq 6$, a total of an Si content (calculated as $SiO_2$) and a Ca content (calculated as CaO) being 0.2 weight % or less, and the total of an Al content (calculated as $Al_2O_3$) and a Cr content (calculated as $Cr_2O_3$) being 0.13 weight % or less in the ferrite powder.

THE BEST MODE FOR CONDUCTING THE INVENTION

[1] A ferrite powder

Figure 1:
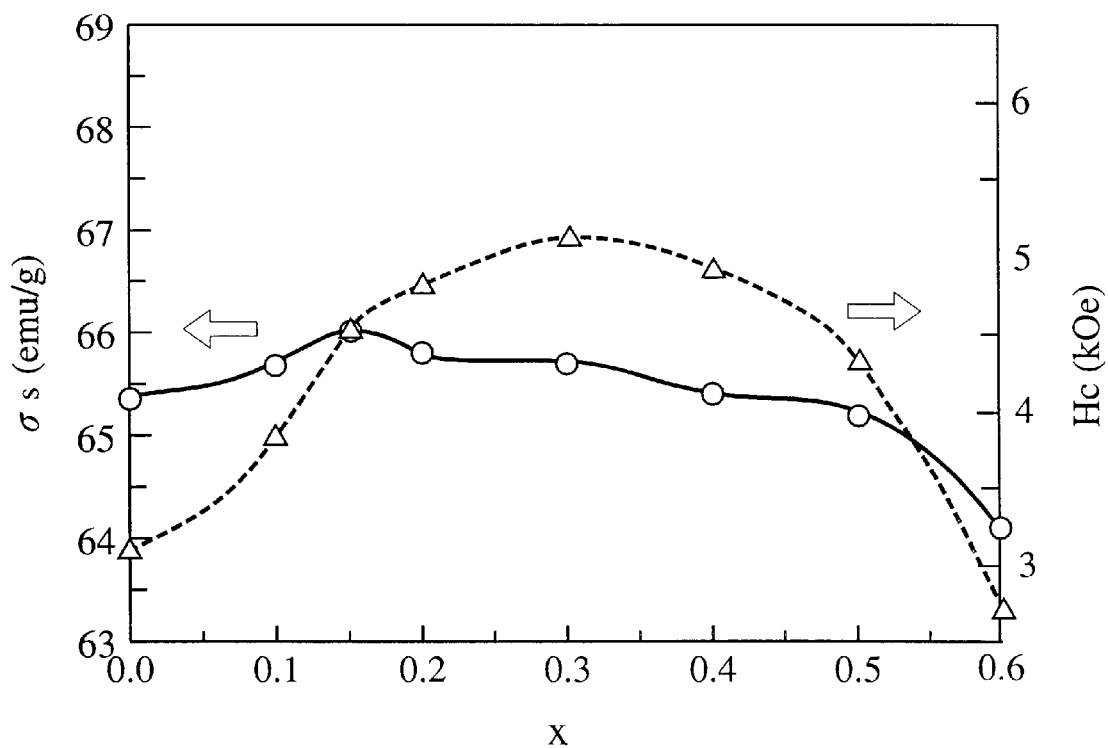
FIG. 1 is a graph showing one example of the correlation between the amount (x) of an R element and a saturation magnetization σs and a coercivity Hc in a calcined coarse ferrite powder used in the present invention.

The ferrite powder of the present invention substantially has a magnetoplumbite-type crystal structure having a basic composition represented by the following general formula:

$(A_{1-x}R_x)O \cdot n[(Fe_{1-y}M_y)_2O_3]$ by atomic ratio, wherein A is Sr and/or Ba; R is at least one of rare earth elements including Y, La being indispensable; M is at least one element selected from the group consisting of Co, Mn, Ni and Zn; and x, y and n are numbers meeting the following conditions:

$0.01 \leq x \leq 0.4$, $[x/(2.6n)] \leq y \leq [x/(1.6n)]$, and $5 \leq n \leq 6$, and having an average diameter of 0.9–2 μm.

To have good magnetic properties as the ferrite powder for bonded magnets, the value of n (molar ratio) should be between 5 and 6. When the value of n exceeds 6, undesirable phases such as $\alpha\text{-}Fe_2O_3$ other than the magnetoplumbite phase are generated, resulting in drastic decrease in magnetic properties. On the other hand, when the value of n is less than 5, Br of the ferrite powder drastically decreases.

The value of x is between 0.01 and 0.4. When the value of x exceeds 0.4, the magnetic properties of the ferrite powder rather decrease. On the other hand, when the value of x is less than 0.01, sufficient effects of the post-addition method or the prior/post-addition method cannot be obtained.

R is at least one of rare earth elements including Y, La being indispensable. R-supplying starting materials may be composite rare earth oxides containing one or more of La, Nd, Pr and Ce. To increase σs, the percentage of La in R is preferably 50 atomic % or more, more preferably 70 atomic % or more, particularly preferably 99 atomic % or more. R may be composed of La only.

M may be any of Co, Mn, Ni and Zn, and Co is particularly preferable to obtain a high coercivity. Further, M may preferably be Co+Zn, and to achieve iHc≧3.5 kOe, the percentage of Co in M is preferably 50–90 atomic %, more preferably 70–90 atomic %. To achieve iHc≧2.5 kOe without neglecting Br, the percentage of Co in M is preferably 5 atomic % or more and less than 50 atomic %, more preferably 5–30 atomic %. When the percentage of Co in M is less than 5 atomic %, sufficient effects of improving iHc by Co cannot be obtained. On the other hand, when the percentage of Co in M exceeds 90 atomic %, sufficient effects of improving Br by Zn cannot be obtained.

For the purpose of charge compensation, x and y should satisfy the relation of y=x/(2.0n). However, as long as y is from x/(2.6n) to x/(1.6n), the effects of the present invention by charge compensation are not substantially deteriorated. When the value of y deviates from x/(2.0n), there is likelihood that $Fe^{2+}$ is contained without causing problems. On the other hand, when the ratio of x/ny exceeds 2.6 or is less than 1.6, remarkable decrease in magnetic properties is appreciated. Accordingly, the ratio of x/ny should be between 1.6 and 2.6. This condition may be converted to the formula of y as follows:

[x/(2.6n)]≦y≦[x/(1.6n)].

In typical example, the preferred range of y is 0.04 or less, particularly 0.005–0.03. Even when the contents of the R element and the M element meet the equation of y=x/(2.0n), part of the R element and/or the M element may be accumulated in high concentration in the vicinity of grain boundaries, without causing any problems.

As impurities contained in the ferrite powder, a total of a Si content calculated as $SiO_2$ and a Ca content calculated as CaO should be 0.2 weight % or less, and a total of an Al content calculated as $Al_2O_3$ and a Cr content calculated as $Cr_2O_3$ should be 0.13 weight % or less. When the total of the Si content and the Ca content exceeds 0.2 weight %, or when the total of the Al content and the Cr content exceeds 0.13 weight %, it is impossible to obtain bonded magnets having excellent magnetic properties. The preferred total of the Si content and the Ca content is 0.15 weight % or less, and the preferred total of the Al content and the Cr content is 0.1 weight % or less. Because the purity of starting materials and quality of materials for a ball-milling apparatus are limited for practical reasons, it is actually difficult that the total of the Si content calculated as $SiO_2$ and the Ca content calculated as CaO is 0.005 weight % or less, and the total of the Al content calculated as $Al_2O_3$ and the Cr content calculated as $Cr_2O_3$ is 0.005 weight % or less.

The ferrite powder for bonded magnets according to the present invention may be produced, for instance, by a solid-state reaction method, by the steps of mixing of starting material powders→calcination for ferritization reaction (solid-state reaction)→pulverization→heat treatment.

The purity of iron oxide used in the ferritization reaction (solid-state reaction) is important. The total of the Si content (calculated as $SiO_2$) and the Ca content (calculated as CaO) is preferably 0.06 weight % or less, more preferably 0.05 weight % or less, particularly preferably 0.04 weight % or less. Also, the total of the Al content (calculated as $Al_2O_3$) and the Cr content (calculated as $Cr_2O_3$) is preferably 0.1 weight % or less, more preferably 0.09 weight % or less, particularly preferably 0.08 weight % or less. Therefore, it is preferable to use recycled iron oxide obtained by spray-roasting a waste liquid generated by washing steel with hydrochloric acid. This recycled iron oxide is advantageous in low impurity content over iron oxide obtained by refining iron ore through the steps of iron ore→fine pulverization→classification→magnetic separation, and iron oxide from iron sulfate obtained by treating mill scales or scraps.

Preferable as materials for supplying the R elements are, for instance, one or more of oxides such as $La_2O_3$, hydroxides such as $La(OH)_3$, carbonate hydrates such as $La_2(CO_3)_3.8H_2O$, organic acid salts such as $La(CH_3CO_2)_3.1.5H_2O$, $La_2(C_2O_4)_3.10H_2O$, etc. Further, one or more of oxides, hydroxides, carbonates and organic acid salts of mixtures of rare earth elements (La, Nd, Pr and Ce) may also be used.

Compounds of M elements are preferably, for instance, one or more of oxides such as CoO, $CO_3O_4$; hydroxides such as $Co(OH)_2$, $Co_3O_4.m_1H_2O$, wherein $m_1$ is a positive number; carbonates such as $CoCO_3$; basic carbonates such as $m_2CoCO_3.m_3Co(OH)_2.m_4H_2O$, wherein $m_2$, $m_3$ and $m_4$ are positive numbers. One or more oxides, hydroxides or carbonates of Mn or Ni may also be used. Further, one or more oxides, hydroxides or carbonates of Zn may be used.

Starting material powders are preferably mixed in advance such that the target composition is achieved at a calcination step. When the R element and the M element are added at a mixing step, the powder mixture is subjected to two heating steps of calcination and heat treatment, resulting in more uniform ferrite composition due to well proceeded solid diffusion.

Mixing, calcination and pulverization may be carried out substantially under the same conditions as in sintered ferrite magnets. For instance, after the wet mixing, a ferritization reaction is carried out by heating at 1150–1300° C. for 1–5 hours in the air. A heating temperature lower than 1150° C. fails to achieve sufficient ferritization, and a heating temperature exceeding 1300° C. makes a calcined body extremely hard, resulting in drastically decreased pulverization efficiency. The pulverization step is preferably a combination of a coarse pulverization step using a crusher, and a fine pulverization step using a pulverizer. The fine pulverization is preferably carried out by using an attritor, a ball mill, a vibration ball mill, etc.

To avoid the inclusion of Al, Si and Cr into ferrite powder in the pulverizer used in the present invention, a pulverization chamber (pulverization cylinder) of the pulverizer and a pulverization medium therein, which are in direct contact with powder being pulverized, are preferably made of chromium steel (Si: 0.15–0.35 weight %, Cr: 0.90–1.20 weight %) such as SCr 415, 420, 430, 435, 440, 445 according to JIS G 4104. High-carbon chromium bearing steel (Si: 0.15–0.70 weight %, Cr: 0.90–1.60 weight %) such as SUJ 1, 2, 3 according to JIS G 4805 may also be used.

The fine powder preferably has an average diameter of 0.8–1.9 μm, more preferably 0.9–1.4 μm, particularly preferably 0.95–1.2 μm. The average diameter of ferrite powder is measured by an air permeation method using a Fischer Subsieve sizer.

The heat treatment is preferably carried out at 750–950° C. for 0.5–3 hours in the air. It is difficult to increase iHc under the conditions of lower than 750° C.×0.5 hours, and the conditions exceeding 950° C.×3 hours provides extreme agglomeration of ferrite powder, resulting in drastic decrease in Br. The preferred heat treatment temperature is 750–900° C. To prevent the agglomeration of ferrite powder by the heat treatment, it is preferable to use a tumbling-type or fluidized bed-type heat treatment apparatus.

The heat treatment increases the average diameter of the fine ferrite powder by about 0.05–0.1 µm. Accordingly, the heat-treated ferrite powder has an average diameter of preferably 0.9–2 µm, more preferably 1.0–1.5 µm, and particularly preferably 1.05–1.3 µm. When the average diameter is less than 0.9 µm, the filling rate of magnetic powder in a blend for a bonded magnet is low, resulting in drastic decrease in a density, Br and $(BH)_{max}$ of the resultant bonded magnet. On the other hand, when the average diameter exceeds 2 µm, it is difficult to achieve iHc≦3.5 kOe even when R=La, and M=Co.

In the production of the ferrite powder of the present invention, the fine ferrite powder adjusted to have an average diameter of 0.85–1.95 µm may be mixed with a Bi compound in an amount of 0.2–0.6 weight % calculated as $Bi_2O_3$, and then subjected to a heat treatment at 825–950° C. for 0.5–3 hours to remove strain, thereby imparting high magnetization and coercivity. The heat treatment conditions of lower than 825° C.×0.5 hours fails to provide sufficient agglomeration suppressing effects by the melting of $Bi_2O_3$ to a liquid phase, and also fails to achieve sufficient iHc. On the other hand, when the heat treatment conditions exceed 950° C.×3 hours, iHc increases while Br relatively decreases. By a heat treatment after the addition of the Bi compound in an amount of 0.2–0.6 weight % calculated as $Bi_2O_3$, a tendency is appreciated that the ferrite powder becomes thicker in a C-axis direction than in the case of no addition, resulting in more rounded particle shape. The round shape of the ferrite powder is preferable because of improved dispersibility, filling ratio and magnetic orientation in a binder. The addition of less than 0.2 weight % of the Bi compound fails to provide sufficient effects, while effects are saturated over 0.6 weight % of the Bi compound.

[2] Anisotropic granulated powder

In the production of a long, cylindrical ferrite bonded magnet having a polar or radially anisotropic to obtain magnet rolls for copiers and printers, well-moldable compounds are desired because of the long shape of the bonded magnet. Accordingly, it is preferable to properly increase the average diameter of ferrite powder blended in compounds. As described above, however, the ferrite powder having an average diameter exceeding 2 µm provides iHc of less than 3.5 kOe even when R=La, and M=Co, resulting in drastic decrease in Br. As a result of intense research, it has been found that the above problems can be solved by making an anisotropic granulated powder by agglomerating a plurality of ferrite powder of the present invention in the same magnetization direction.

The anisotropic granulated powder can be produced by the steps of mixing of starting material powders→ferritization reaction (solid-state reaction) →calcination→pulverization→molding in magnetic field→disintegration→heat treatment→disintegration in water. The iron oxide used in this case may have the same purity as in the above ferrite powder.

The calcined ferrite powder is finely pulverized to an average diameter of preferably 0.9–1.4 µm, more preferably 0.95–1.35 µm, particularly preferably 1.0–1.3 µm. When the fine powder has an average diameter of less than 0.9 µm, the anisotropic granulated powder has drastically decreased Br. On the other hand, when the average diameter of the fine powder exceeds 1.3 µm, Br and iHc decrease. The pulverized ferrite powder is then subjected to wet- or dry-molding in a magnetic field. In either wet or dry, the molding is preferably carried out at room temperature under pressure of about 0.35–0.45 ton/cm² while applying a magnetic field of 8–15 kOe. The resultant anisotropic granulated powder has a density of about 2.6–3.2 g/cm³. The resultant green body is then disintegrated by a jaw crusher, etc. and classified by a sieve or wind to adjust the final average diameter to more than 2 µm and 10 µm or less.

The anisotropic granulated powder thus produced is heat-treated under the same conditions as in the above ferrite powder. To break the agglomeration of the heat-treated powder, the heat-treated powder is preferably immersed in a liquid such as water, and stirred, if necessary. The resultant anisotropic granulated powder has such magnetic anisotropy that an easy-magnetization axis aligned substantially in the same direction.

The average diameter of the anisotropic granulated powder is preferably more than 2 µm and 10 µm or less, more preferably 2.5–5 µm, particularly preferably 3–4 µm. The average diameter of 2 µm or less would not be advantageous over the above ferrite powder. On the other hand, the average diameter exceeding 10 µm would provide drastic decrease in Br. Incidentally, the average diameter of the anisotropic granulated powder is measured by a Heros Rodos particle size distribution measuring apparatus available from JEOL LTD.

Because the anisotropic granulated powder has higher iHc, not less than Br and an larger average diameter than those of the conventional Sr and/or Ba ferrite powder, the moldability of compounds are improved by using the anisotropic granulated powder. Thus, in the case of a long, cylindrical ferrite bonded magnet, the unevenness of a surface magnetic flux density in a longitudinal direction is smaller when the anisotropic granulated powder is used than when the ferrite powder that is not subjected to anisotropic granulation is used. Therefore, the long, cylindrical bonded magnet formed from the anisotropic granulated powder is suitable for magnet rolls of copiers or printers for producing copies or prints free from unevenness. It is also useful for rotors.

[3] Bonded magnet

The bonded magnet is produced from the ferrite powder or the anisotropic granulated powder thereof by the steps of surface treatment→blending with binder→molding. The strength and/or Br of the bonded magnet can be improved by carrying out a surface treatment comprising adding 0.1–1 weight % of a surface-treating agent such as a silane coupling agent, a titanate coupling agent, etc. to the ferrite powder or its anisotropic granulated powder before blending, and if necessary, heating at 70–150° C. for 0.5–3 hours in the air.

85–95 parts by weight of the ferrite powder or its anisotropic granulated powder is preferably blended with 15–5 parts by weight of a binder. Thermoplastic resins, thermosetting resins or rubbers may usually be used as the binder. When the thermosetting resins are used, a heat-setting treatment should be carried out after molding. In addition, low-melting point metals or alloys having melting points lower than the Curie temperature of the ferrite powder may be used. When the amount of the ferrite powder added is less than 85 weight %, it is difficult to obtain high Br. On the other hand, when it exceeds 95 weight %, the filling of the ferrite powder in the bonded magnet becomes difficult, resulting in large numbers of small pores contained in the resultant green body, which leads to decrease in the density, Br and $(BH)_{max}$ of the bonded magnet. In addition to the above indispensable components, the compounds may preferably contain magnetic powder-dispersing agents such as phenols, lubricants such as waxes, plasticizers such as DOP, DBP, etc. alone or in combination. The total amount of these additives is preferably 3 weight % or less, more preferably 1–2 weight %.

The molded article is anisotropic or isotropic depending on the presence or absence of an orientation magnetic field and/or mechanical stress. Molding may be carried out by an injection molding method, an compression molding method, or an extrusion molding method.

[4] Magnet roll

The preferred embodiment of the above bonded magnet is a magnet roll, and a bonded magnet for a magnet roll is provided with radial or polar anisotropy. The bonded magnet for a magnet roll should not necessarily be integral, and what is necessary is that at least one magnetic pole portion is constituted by the anisotropic bonded magnet of the present invention.

Figure 5:
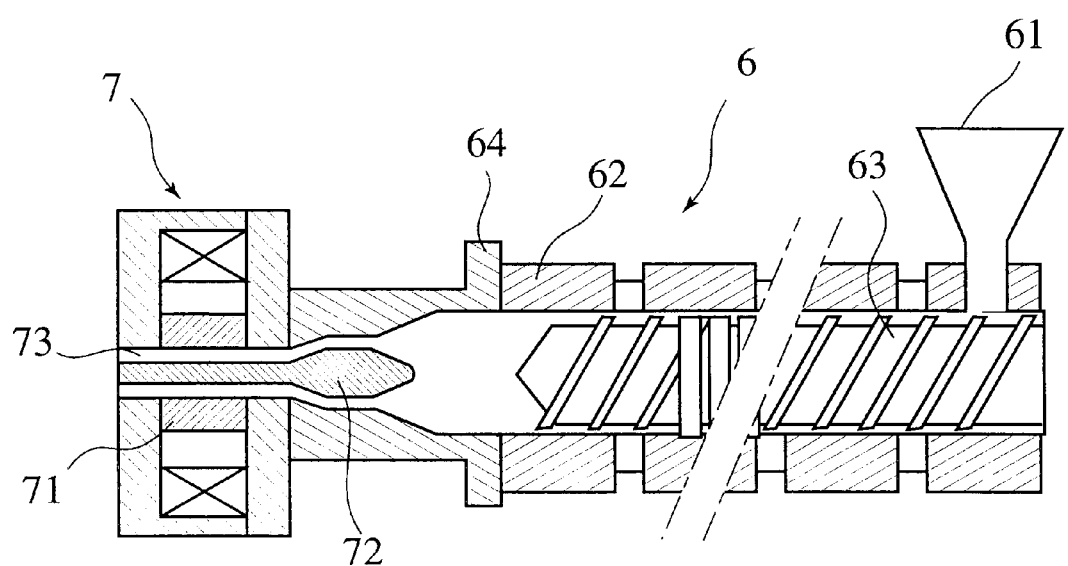
FIG. 5 is a cross-sectional view showing one example of an apparatus for forming a radially anisotropic magnet roll of the present invention.
Figure 6:
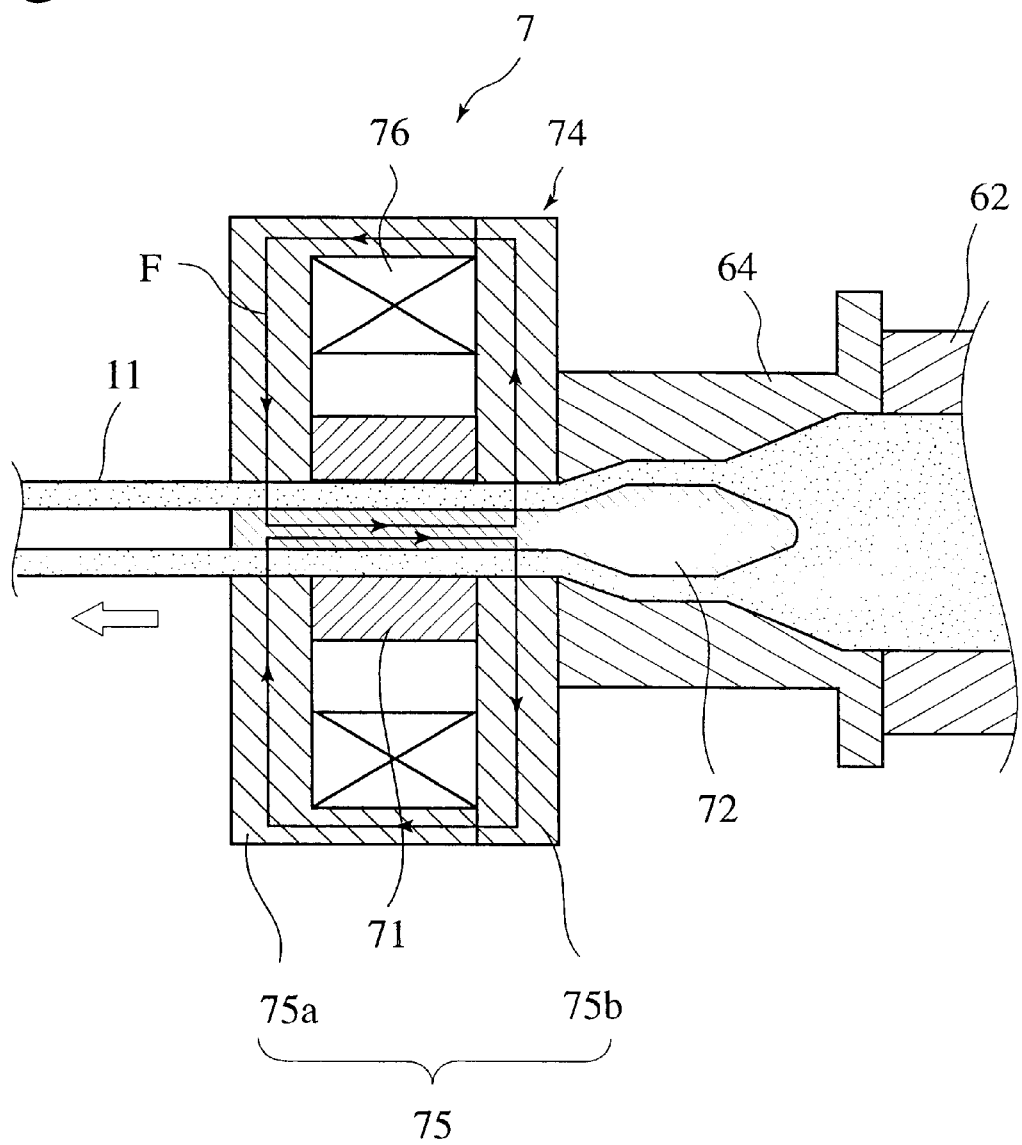
FIG. 6 is a cross-sectional view showing the detailed structure of an orientation die in the forming apparatus of FIG. 5.

FIGS. 5 and 6 show the structure of an apparatus for producing an integral, cylindrical bonded magnet having radial anisotropy for a magnet roll. FIG. 5 is a cross-sectional view showing the entire structure of the molding apparatus, and FIG. 6 is a cross-sectional view showing the detailed structure of an essential part (die for orientation) of the molding apparatus in FIG. 5. In FIG. 5, a double-screw extruder 6 constituting the molding apparatus comprises a barrel 62 consisting of a plurality of parts and equipped with a hopper 61 at one end, two screws 63 (only one is shown in the figure) disposed in the barrel 62, and an adapter 64 mounted to a tip end of the barrel 62. An orientation die 7 is mounted to the adapter 64 at its exit. This die 7 comprises a ring-shaped spacer 71, a ring-shaped mandrel 72, a cylindrical molding space 73 existing between them, and magnetic field-generating means 74 disposed around the ring-shaped spacer 71.

In FIG. 6 the magnetic field-generating means 74 comprises a cylindrical yoke 75 made of ferrimagnet composed of a first yoke 75a and a second yoke 75b, and a plurality of coils 76 disposed at predetermined intervals inside the cylindrical yoke 75 such that it encircles the molding space 73. Magnetic flux F flows in the yoke 75 as shown in FIG. 6.

Using the molding apparatus 6, a radially anisotropic bonded magnet can be produced in a manner as described below. A starting material introduced into the barrel 62 through the hopper 61 is subjected to shear stress by the rotation of a pair of screws 63, and conveyed to the orientation die 7 while being molten by heating at a temperature of 150–230° C. The molten material passes through a molding space reduced to a predetermined cross section in the orientation die 7 while being applied a magnetic field. Specifically, the intensity of a magnetic field may be 3–6 kOe. When molded in a radially or polar anisotropic magnetic field having such a level of intensity, radially or polar anisotropic bonded magnets having practically satisfactory magnetic properties can be obtained. When the magnetic field intensity is too low, sufficient orientation cannot be obtained.

Figure 7:
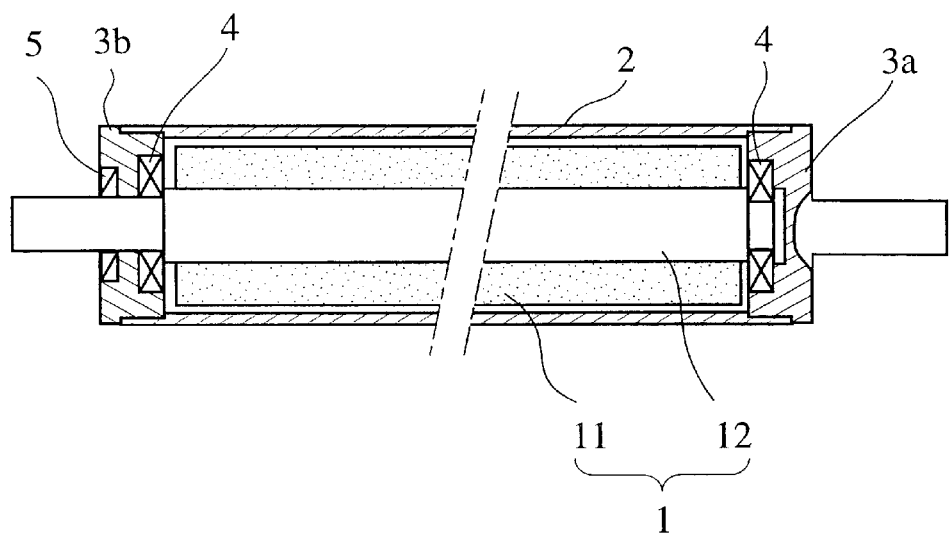
FIG. 7(a) is a longitudinal cross-sectional view showing a magnet roll apparatus into which a cylindrical bonded magnet of the present invention is assembled.
FIG. 7(b) is a transverse cross-sectional view showing the magnet roll apparatus of FIG. 7(a)
Figure 7:
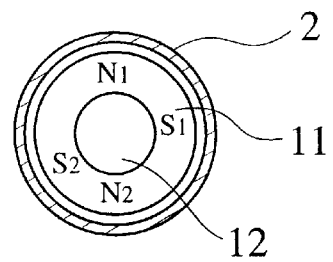

After extruded from the die, the radially anisotropic molded article 11 is cut to a proper length (L/D≧5), cooled for solidification and then demagnetized. This molded article is fixed to a shaft 12 to provide a magnet roll as shown in FIG. 7. In FIG. 7, 2 denotes a sleeve, 3a and 3b denote supports for the sleeve 2, 4 denotes a bearing, and 5 denotes a seal.

Though an example shown in FIGS. 5–7 is related to an integral, cylindrical bonded magnet, the present invention is not restricted to such a bonded magnet. What is necessary is that at least one magnetic pole portion is formed by the anisotropic bonded magnet of the present invention. For instance, a radially or polar anisotropic bonded magnet formed in an arc segment shape may be bonded together to a cylindrical shape. Further, a cylindrical permanent magnet (for instance, isotropic ferrite magnet or ferrite bonded magnet having a conventional composition) for a magnet roll may be provided with a longitudinal groove on a surface thereof, and the anisotropic bonded magnet of the present invention in a shape of a long block (for instance, having U-cross section) may be fixed into the groove to provide a magnetic pole.

When the bonded magnet is provided with a radial anisotropy, the magnet roll 1 of the present invention has not only improved Br but also a plurality of magnetic poles on a surface. Therefore, any desired arrangement of magnetic poles can be selected in the magnet roll of the present invention.

The present invention will be described in detail referring to EXAMPLES below, without intention of restricting the scope of the present invention thereto.

EXAMPLE 1

Comparative Example 1

Used as high-purity iron oxide ($\alpha$-$Fe_2O_3$) was recycled iron oxide obtained by spray-roasting a waste liquid generated by washing steel with hydrochloric acid, whose composition is shown in Table 1.

TABLE 1

| Component | Content (weight %) |
|---|---|
| $Fe_2O_3$ | 99.40 |
| Cl | 0.056 |
| $SO_4$ | 0.020 |
| MnO | 0.290 |
| $SiO_2$ | 0.010 |
| CaO | 0.018 |
| $Cr_2O_3$ | 0.027 |
| $Al_2O_3$ | 0.060 |

The high-purity iron oxide, $SrCO_3$ having a purity of 99% or more, oxides of R elements and oxides of M elements were formulated to provide the following basic composition: $(Sr_{1-x}R_x)O \cdot n[(Fe_{1-y}M_y)_2O_3]$ by atomic ratio, wherein x=0.15, and y=x/2n=0.0125, n=6.0, wet-mixed, and then calcined at 1200° C. for 2 hours in the air. La was selected as the R element under the criterion that La has an ion radius close to a radius of a Sr ion. Also, Ti, V, Mn, Co, Ni, Cu and Zn were selected as the M elements under the criterion that they had ion radii close to a radius of an Fe ion. As a conventional material, ferrite having the above basic composition in which x=y=0 and n=6.0, namely $SrO \cdot 6Fe_2O_3$, was calcined under the same conditions.

Each calcined powder was coarsely pulverized in a dry state by a roller mill, and each of the resultant coarse powder (average diameter: 5–10 μm, measured by a Heros Rodos particle size distribution measuring apparatus) was measured with respect to magnetic properties by a vibration-type magnetometer. The highest intensity of a magnetic field in which measurement was carried out was 12 kOe, and a saturation magnetization σs and Hc were determined by σ-1/H² plot, wherein σ is magnetization and H is the intensity of a magnetic field applied. The resultant phases of the coarse powder were identified by X-ray diffraction, and the results are shown in Table 2.

TABLE 2

| No. | Sample No. | R Element | M Element (atomic %) | σs (emu/g) | Hc (kOe) | Phase Produced |
|---|---|---|---|---|---|---|
| Ex. 1 | 1 | La | 100 Mn | 67.1 | 3.7 | M Phase |
| | 2 | La | 50 Mn + 50 Co | 66.8 | 3.9 | M Phase |
| | 3 | La | 100 Co | 66.0 | 4.5 | M Phase |
| | 4 | La | 100 Ni | 66.1 | 2.9 | M Phase |
| | 5 | La | 50 Ni + 50 Co | 65.9 | 3.5 | M Phase |
| | 6 | La | 50 Zn + 50 Co | 67.8 | 3.6 | M Phase |
| | 7 | La | 100 Zn | 68.9 | 3.1 | M Phase |
| Com. Ex. 1 | 11 | La | 100 Ti | 64.6 | 3.1 | M Phase |
| | 12 | La | 50 Ti + 50 Co | 62.1 | 0.8 | M Phase |
| | 13 | La | 100 V | 59.0 | 6.4 | M Phase |
| | 14 | La | 50 V + 50 Co | 59.1 | 6.4 | M Phase |
| | 15 | La | 100 Cu | 65.8 | 0.3 | M Phase + Undesirable Phase |
| | 16 | La | 50 Cu + 50 Co | 65.1 | 1.2 | M Phase + Undesirable |
| | 21 | — | — | 65.4 | 3.1 | M Phase |

It is appreciated from Table 2 that when Cu was not contained as the M element, only X-ray diffraction peaks for a magnetoplumbite phase (M phase) were observed in any powder. Table 2 also indicates that when La was selected as the R element, and Mn, Mn+Co, Ni, Ni+Co, or Zn+Co was selected as the M element, the resultant calcined powder had higher σs (or higher σs and Hc) than the conventional coarse powder of $SrO \cdot 6Fe_2O_3$, suggesting that such calcined powder can be formed into high-performance bonded magnets. An isotropic bonded magnet can be produced from each coarse powder of EXAMPLE 1 in Table 2, by heat treatment, if necessary, under the above-described conditions, mixing with a binder at a proper ratio, blending to form a compound, and then injection molding, compression molding or extrusion molding without a magnetic field.

Further, it has been found from investigation in connection with the above experiments that a combination of R=La+Pr, La+Nd, La+Ce, La+Nd+Pr, La+Pr+Ce or La+Nd+Pr+Ce may be used, and that the percentage of La in the R element is required to be 50 atomic % or more to obtain higher σs than that of the conventional coarse powder of $SrO \cdot 6Fe_2O_3$.

EXAMPLE 2

Sr, La and Co were selected as the A element, the R element and the M element, respectively, and $SrCO_3$, iron oxide, $La_2O_3$ and CoO each having substantially the same purity as in EXAMPLE 1 were formulated to provide the following basic composition:

$(Sr_{1-x}La_x)O \cdot n[(Fe_{1-y}Co_y)_2O_3]$ by atomic ratio, wherein x=0–0.6, y=x/2n=0–0.05, and n=6.0, wet-mixed, and then calcined at 1200° C. for 2 hours in the air. The calcined powder was coarsely pulverized in the same manner as in EXAMPLE 1 and then measured with respect to magnetic properties. The results are shown in FIG. 1.

It is clear from FIG. 1 that when both $La_2O_3$ and CoO are added, a higher coercivity Hc is obtained at x=0.01–0.4 than at x=0, and a higher saturation magnetization σs is obtained at x=0.01–0.4 than at x=0. Accordingly, the range of x is $0.01 \leq x \leq 0.4$, preferably $0.05 \leq x \leq 0.4$, more preferably $0.07 \leq x \leq 0.4$, to achieve high potential of σs and Hc.

Further, in the coarse ferrite powder produced from starting materials having the same purity as in EXAMPLE 1, substantially the same tendency as shown in FIG. 1 is appreciated in the case of the basic composition of $(Sr_{1-x}La_x)O \cdot n[(Fe_{1-y}Co_y)_2O_3]$ by atomic ratio, and (a) when the R element is 50 atomic % La+50 atomic % Pr, 50 atomic % La+50 atomic % Nd, or 50 atomic % La+50 atomic % Ce, and the M element is Co, or (b) when the R element is La, and the M element is 50 atomic % Co+50 atomic % Zn, 50 atomic % Co+50 atomic % Mn, or 50 atomic % Co+50 atomic % Ni.

The ferrite powder of the present invention shows substantially the same tendency as shown in FIG. 1, when the value of n is 5.0–6.0. Therefore, it is possible to achieve improvement in σs and Hc by the addition of the R element and the M element at the value n of 5.0–6.0.

EXAMPLE 3

In this EXAMPLE, the permissible ratio of the R element to the M element in connection with charge compensation was determined. Sr, La and Co were selected as the A element, the R element and the M element, respectively, and $SrCO_3$, iron oxide, $La_2O_3$ and CoO each having substantially the same purity as in EXAMPLE 1 were formulated to provide the following basic composition:

$(Sr_{1-x}La_x)O \cdot n[(Fe_{1-y}Co_y)_2O_3]$ by atomic ratio, wherein x=0.15, y=0.77–1.43×10$^{-2}$, and n=6.0, wet-mixed, and then calcined at 1200° C. for 2 hours in the air. The calcined powder was coarsely pulverized in the same manner as in EXAMPLE 1 and then measured with respect to magnetic properties.

It has thus been found that a high-performance bonded magnet having higher Br (or higher Br and iHc) than those of the conventional Sr and/or Ba ferrite bonded magnets can be obtained, as long as the ratio of x/ny is within the range of 1.6–2.6, not limited to the conditions under which the charge balance is fully kept, namely to a ratio of x to y satisfying the relation of y=x/2n. On the other hand, when the ratio of x/ny exceeds 2.6 or is less than 1.6, deterioration in magnetic properties due to the failure of the charge balance is appreciated. Accordingly, the ratio of x/ny should be between 1.6 and 2.6. This condition may be converted to the formula of y as follows:

$[x/(2.6n)] \leq y \leq [x/(1.6n)]$.

EXAMPLE 4

La and Co were selected as the R element and the M element, respectively, and $SrCO_3$, iron oxide, $La_2O_3$ and $Co_3$ oxides each having substantially the same purity as in EXAMPLE 1 were formulated to provide the following basic composition:

$(Sr_{1-x}La_x)O \cdot n[(Fe_{1-y}Co_y)_2O_3]$ by atomic ratio, whereat x=0.15, y=x/2n, and n=5.85, wet-mixed, and then calcined at 1200° C. for 2 hours in the air. The calcined powder was coarsely pulverized in a dry state by a roller mill.

700 g of the resultant coarse powder was charged into a ball mill pot [volume: 10 liters, made of SUJ3 (C: 0.95–1.10 weight %, Si: 0.40–0.70 weight %, Mn: 0.90–1.15 weight %, Cr: 0.90–1.20 weight %, P: 0.025 weight % or less, S: 0.025 weight % or less)], together with 10 kg of steel balls (each diameter: 6 mm, made of SUJ3) as pulverization media and ethyl alcohol (pulverization aid added in a small amount to suppress agglomeration of pulverized powder), and the pot was sealed. The amount of ethyl alcohol added at an initial stage was 50 cm$^3$, and 10 cm$^3$ of ethyl alcohol was added every time the average diameter of the coarse powder was measured. Dry fine pulverization may be carried out by ball milling at a peripheral speed of 0.7 m/sec.

With varied pulverization time, fine ferrite powder having an average diameter of 0.7–1.95 μm was obtained. Each of the resultant fine powder was introduced into a heat-resistant container, which was set in an electric furnace heated in the same atmosphere as the air. After annealing heat treatment at 830±2° C. for 3 hours to remove strain, the fine powder was cooled to room temperature. After the heat-treated fine powder was charged into water to disintegrate the agglomeration of fine particles due to the heat treatment, it was heated at 100° C. to remove moisture and then cooled to room temperature. To disintegrate the dried powder, the fine powder was caused to pass through a 150-mesh sieve to obtain ferrite powder having an average diameter of 0.8–2.0 μm. The average diameter of ferrite powder was measured by an air permeation method using a Fischer Subsieve sizer.

The above ferrite powder was separated to provide a fraction having an average diameter of 0.8–1.6 μm, which was sealed in a holder of VSM to measure a maximum magnetization ($\sigma_{4kOe}$) while applying a parallel magnetic field of 4 kOe at 20° C. The correlation of average diameter and $\sigma_{4kOc}$ in each powder is shown by ○ in FIG. 2.

Also measured with respect to the ferrite powder obtained by the same method were an average diameter, increase of the Si content ($\Delta SiO_2$, calculated as $SiO_2$) and the Cr content ($\Delta Cr_2O_3$, calculated as $Cr_2O_3$), the amount calculated as ($SiO_2+CaO$) and the amount calculated as ($Al_2O_3+Cr_2O_3$) from "before calcination" to "after pulverization." The results are shown in Table 3. It is clear from Table 3 that in any ferrite powder for bonded magnets having each average diameter, $\Delta SiO_2$ was 0.018–0.142 weight %, and $\Delta Cr_2O_3$ was 0.002–0.009 weight %. For instance, in the case of Sample No. 32, $\Delta SiO_2$ was 0.108 weight %, and $\Delta Cr_2O_3$ was 0.008 weight % by the fine pulverization. In the case of Sample Nos. 31–33, 85% or more of $\Delta SiO_2$ was attributed to inclusion at the fine pulverization step. Other portions of $\Delta SiO_2$ were attributed to inclusion at the coarse pulverization step, the water immersion step after the heat treatment, and the classification step by a sieve. 80% or more of $\Delta Cr_2O_3$ in Sample Nos. 31–36 was attributed to inclusion at the fine pulverization step.

Comparative Example 2

For comparison, calcination, coarse pulverization, fine pulverization, heat treatment, immersion in water, drying and 150-mesh sieving were carried out to produce ferrite powder having an average diameter of 0.8–2.0 μm, in the same manner as in EXAMPLE 4 except for using $SrCO_3$ and iron oxide each having the same purity as in EXAMPLE 1 for a basic composition of $SrO.5.85Fe_2O_3$, and making the finely pulverized ferrite powder have an average diameter of 0.75–1.93 μm. A ferrite powder fraction having an average diameter of 0.82–1.60 μm, which was separated from the resultant ferrite powder, was sealed in a holder of VSM to measure a maximum magnetization ($\sigma_{4kOe}$) while applying a parallel magnetic field of 4 kOe at 20° C. The correlation of average diameter and $\sigma_{4kOe}$ in each powder is shown by ● in FIG. 2.

Also measured with respect to the ferrite powder obtained by the same method were an average diameter, $\Delta SiO_2$, $\Delta Cr_2O_3$, ($SiO_2+CaO$) and ($Al_2O_3+Cr_2O_3$). The results are shown in Table 3. The comparison of ferrite powder having substantially the same average diameter in Table 3 clearly shows that $\Delta SiO_2$, $\Delta Cr_2O_3$, ($SiO_2$ +CaO) and ($Al_2O_3+Cr_2O_3$) of the ferrite powder having this conventional composition are not different from those of EXAMPLE 4 (indicated by ○).

Figure 2:
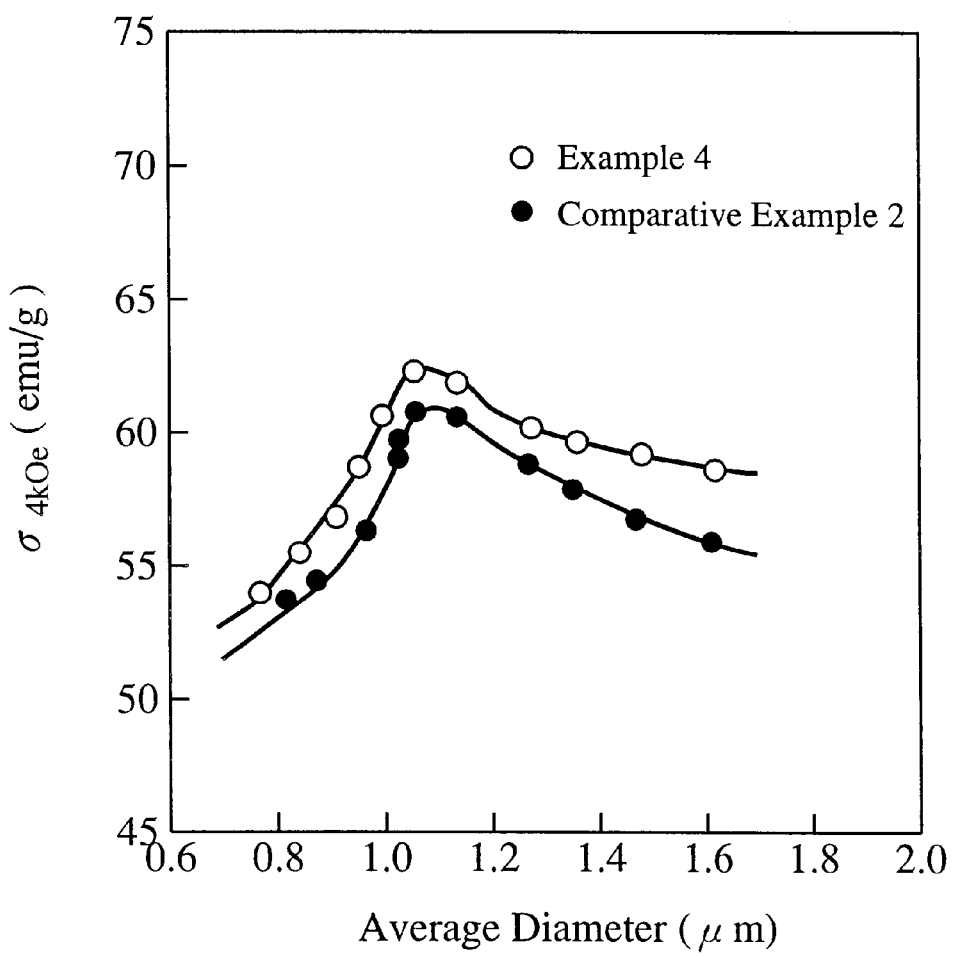
FIG. 2 is a graph showing one example of the correlation between average diameter and magnetization $\sigma_{4kOe}$ at 4kOe in the ferrite powders of the present invention.

As is clear from FIG. 2, however, the ferrite powder of EXAMPLE 4 (indicated by ○) shows higher $\sigma_{4kOe}$ by about 1–2 emu/g than that of COMPARATIVE EXAMPLE 2 (indicated by ●) in an average diameter range of 0.8 to 1.6 μm. This verifies that even ferrite powder containing impurities on the same level fails to show high $\sigma_{4kOe}$ unless the requirement of a basic composition is not met.

90 parts by weight of ferrite powder in EXAMPLE 4 or COMPARATIVE EXAMPLE 2, 7.7 parts by weight of an ethylene-ethyl acrylate copolymer (EEA, Mw=43,000, EA content=41 weight %, MB-870, available from Nippon Unicar K. K.), 1.0 parts by weight of a dispersant (DH-37, available from Adeka Argus Chemical Co., Ltd.), and 0.5 parts by weight of a lubricant (Slipacks E, available from Nippon Kasei K. K.) were mixed in a mixer, and the resultant mixture was blended while heating at 150° C. After cooled for solidification, the blend was crushed to particles of 5 mm or less in diameter. After adding 0.8 parts by weight of a silicone oil (KF968, viscosity=100 centistokes at 25° C., surface tension=20.8 dyne/cm at 25° C., available from Shin-etsu Chemical Co., Ltd.), the blend was granulated at 150° C. to provide compounds. The blending and granulation were carried out by a double-screw extruder.

Each of the resultant compounds was charged into an injection molding apparatus and injection-molded into a cavity of a die having a magnetic circuit attached to the injection molding apparatus, under the conditions of an injection temperature of 200° C., an injection pressure of 1000 kgf/cm² and an orientation magnetic field intensity of 4.0±0.2 kOe, to form an anisotropic bonded magnet of 20 mm in length×20 mm in width×10 mm in thickness. Each of the resultant anisotropic bonded magnets was measured with respect to magnetic properties by a B-H tracer at 20° C. The results are shown in Table 3. Table 3 clearly shows the advantages of the bonded magnet formed from the ferrite powder of EXAMPLE 4.

Anisotropic bonded magnets were produced by an injection molding method for the measurement of magnetic properties in the same manner as above except for using two types of compounds obtained from the ferrite powder having an average diameter of 1.05 μm in EXAMPLE 4 and COMPARATIVE EXAMPLE 2 at an orientation magnetic field intensity of 10±0.2 kOe. As a result, the bonded magnet formed from the ferrite powder having an average diameter of 1.05 μm in EXAMPLE 4 had Br of 2,780 G and iHc of 4,470 Oe, and the bonded magnet formed from the ferrite powder having an average diameter of 1.05 μm in COMPARATIVE EXAMPLE 2 had Br of 2,720 G and iHc of 2,900 Oe. This result indicates the advantages of the ferrite powder of the present invention even at a magnetic field intensity of 10 kOe.

In the production of a radially or polar anisotropic ferrite bonded magnet (for instance, solid cylindrical or ring-shaped bonded magnet capable of being magnetized to have 4–24 symmetrical or unsymmetrical magnetic poles), it is difficult to apply as strong a magnetic field as 10 kOe or more. Therefore, it is preferable to use the ferrite powder capable of being well oriented by a magnetic field suitable for mass production of preferably 8 kOe or less, more preferably 6 kOe or less, particularly preferably 3–6 kOe.

TABLE 3

| No. | Sample No. | Average Diameter ($\mu$m) | $\Delta SiO_2$ (%) | $SiO_2 +$ CaO (%) | $\Delta Cr_2O_3$ (%) | $Cr_2O_3 +$ $Al_2O_3$ (%) | Br (G) | iHc (Oe) |
|---|---|---|---|---|---|---|---|---|
| Ex. 4 | 31 | 0.96 | 0.142 | 0.180 | 0.009 | 0.083 | 2520 | 4700 |
|  | 32 | 1.05 | 0.108 | 0.133 | 0.008 | 0.082 | 2720 | 4510 |
|  | 33 | 1.15 | 0.106 | 0.133 | 0.008 | 0.082 | 2670 | 4260 |
|  | 34 | 1.50 | 0.020 | 0.046 | 0.003 | 0.078 | 2610 | 4000 |
|  | 35 | 1.60 | 0.018 | 0.045 | 0.002 | 0.077 | 2530 | 3890 |
|  | 36 | 2.00 | 0.018 | 0.042 | 0.002 | 0.077 | 2450 | 3500 |
| Com. Ex. 2 | 41 | 0.97 | 0.140 | 0.175 | 0.009 | 0.084 | 2470 | 3160 |
|  | 42 | 1.05 | 0.105 | 0.133 | 0.008 | 0.080 | 2630 | 2960 |
|  | 43 | 1.15 | 0.105 | 0.133 | 0.007 | 0.080 | 2610 | 2710 |
|  | 44 | 1.48 | 0.020 | 0.044 | 0.003 | 0.079 | 2550 | 2300 |
|  | 45 | 1.60 | 0.018 | 0.044 | 0.003 | 0.078 | 2480 | 2200 |
|  | 46 | 1.97 | 0.019 | 0.042 | 0.002 | 0.078 | 2390 | 2120 |

EXAMPLE 5

EXAMPLE 4 was repeated up to fine pulverization by a dry ball mill except for using iron oxide, $SrCO_3$, $Fe_2O_3$, $La_2O_3$ and ZnO each having substantially the same purity as in EXAMPLE 1 to provide a basic composition of $(Sr_{0.883}La_{0.117})O\cdot 5.75[(Fe_{0.99}Co0.005Zn0.005)_2O_3]$ by atomic ratio, to provide five types of fine ferrite powder having different average diameters. After adding 0.4 parts by weight of bismuth oxide ($Bi_2O_3$) to 100 parts by weight of each fine ferrite powder, mixing was carried out to provide five types of mixed powder. Each mixed powder was subjected to heat treatment, immersion in water, drying and 150-mesh sieving in the same manner as in EXAMPLE 4, to produce five types of ferrite magnet powder having different average diameters. As shown in Table 4, each ferrite magnet powder was substantially on the same level as those having substantially the same average diameters in Table 3 in any of $\Delta SiO_2$, $\Delta Cr_2O_3$, ($SiO_2+CaO$), and ($Al_2O_3+Cr_2O_3$).

Comparative Example 3

For comparison, five types of ferrite powder having different average diameters for bonded magnets were produced in the same manner as in EXAMPLE 5 except for using a basic composition of $SrO\cdot 5.75Fe_2O_3$. Each ferrite magnet powder was substantially on the same level as those having substantially the same average diameters in Table 3 in any of $\Delta SiO_2$, $\Delta Cr_2O_3$, ($SiO_2+CaO$), and ($Al_2O_3+Cr_2O_3$).

After weighing each ferrite powder of EXAMPLE 5 and COMPARATIVE EXAMPLE 3 shown in Table 4, each powder was charged into a Henschel mixer, in which a surface treatment comprising mixing 100 parts by weight of each ferrite powder with 0.25 parts by weight of aminosilane (KBM-603, available from Shin-etsu Chemical Co., Ltd.), heating the resultant mixture at 80° C. for 3 hours in the air, and then cooling it to room temperature was carried out. 90 parts by weight of each surface-treated ferrite powder was melt-blended with 9.6 parts by weight of 12-nylon (P-3014U, available from Ube Industries, Ltd.) and 0.4 parts by weight of stearic acid amide (AP-1, available from Nippon Kasei K. K.) at an initial temperature of 230° C. by a high-temperature, high-pressure type kneader, and pelletized to produce pellet-shaped compounds.

Each of compounds in EXAMPLE 5 and COMPARATIVE EXAMPLE 3 was charged into an injection molding apparatus and injection-molded into a cavity of a die having a magnetic circuit attached to the injection molding apparatus, under the conditions of an injection temperature of 280° C., an injection pressure of 1000 kgf/cm$^2$ and an orientation magnetic field intensity of 4.0±0.2 kOe, to form an anisotropic bonded magnet of 20 mm in length×20 mm in width×10 mm in thickness. Each bonded magnet was measured with respect to Br and iHc by a B-H tracer at 20° C., and with respect to $\sigma_{4kOe}$ by VSM at 20° C. The results are shown in Table 4 together with the average diameter of ferrite powder added to each bonded magnet.

TABLE 4

| No. | Sample No. | Average Diameter ($\mu$m) | $\sigma_{4kOe}$ (kOe) | Br (G) | iHc (Oe) |
|---|---|---|---|---|---|
| Ex. 5 | 51 | 0.95 | 57.6 | 2550 | 3680 |
|  | 52 | 1.05 | 63.5 | 2760 | 3470 |
|  | 53 | 1.15 | 62.7 | 2700 | 3210 |
|  | 54 | 1.50 | 61.4 | 2640 | 2700 |
|  | 55 | 1.65 | 61.0 | 2610 | 2480 |
| Com. Ex. 3 | 61 | 0.96 | 56.9 | 2480 | 3180 |
|  | 62 | 1.05 | 61.8 | 2650 | 2970 |
|  | 63 | 1.14 | 61.3 | 2620 | 2750 |
|  | 64 | 1.47 | 57.8 | 2560 | 2310 |
|  | 65 | 1.60 | 57.0 | 2480 | 2200 |

As shown in Table 4, when measured on bonded magnets containing ferrite powder having substantially the same average diameter, it has been found that the anisotropic bonded magnet containing each ferrite powder in EXAMPLE 5 was higher than the anisotropic bonded magnet containing each ferrite powder in COMPARATIVE EXAMPLE 3 by 70–130 G in Br and by 280–500 Oe in iHc. It has also been found from investigation in connection with Table 4 that when the percentage of Co in M is 50–90 atomic %, and when the average diameter is 1.0–1.5 $\mu$m, the resultant bonded magnet has Br≧2.6 kG and iHc≧2.7 kOe, usable in high-temperature applications. It has also been found that particularly when the percentage of Co in M is 50–90 atomic %, and when the average diameter is 1.0–1.3 $\mu$m, it is possible to achieve Br≧2.65 kG and iHc≧3 kOe. It has also been found that when the percentage of Co in M is 5 atomic % or more and less than 50 atomic %, and when the average diameter is 1.0–1.5 $\mu$m, the bonded magnet has Br≧2.65 kG and iHc≧2.5 kOe, usable in high-temperature applications. It has further been found that when the percentage of Co in M is 5–30 atomic %, and when the average diameter is 1.0–1.3 $\mu$m, the bonded magnet has Br≧2.7 kG and iHc≧2.5 kOe.

Next, a predetermined amount of ferrite powder in Sample Nos. 52 and 62 in Table 4 was sealed in a holder of VSM. The maximum magnetization ($\sigma_{10kOe}$) was 71.0 emu/g (Sample No. 52) and 69.6 emu/g (Sample No. 62), when a magnetic field of 10 kOe was applied at 20° C.

Further, anisotropic bonded magnets were produced by an injection molding method for the measurement of magnetic properties in the same manner as above except for using two types of compounds obtained from the ferrite powder of Sample Nos. 52 and 62 in Table 4 at an orientation magnetic field intensity of 10±0.2 kOe. As a result, the bonded magnet formed from the ferrite powder of Sample No. 52 had Br of 2,830 G and iHc of 3,440 Oe, and the bonded magnet formed from the ferrite powder of Sample No. 62 had Br of 2,740 G and iHc of 2,900 Oe. This result indicates the advantages of the ferrite powder of the present invention even at a magnetic field intensity of 10 kOe.

EXAMPLE 6

Compounds were produced under the same conditions as in EXAMPLE 5 except for using the ferrite powder of Sample No. 33 (EXAMPLE 4) in Table 3. Also, compounds of Sample No. 53 (EXAMPLE 5) and Sample No. 63 (COMPARATIVE EXAMPLE 3) in Table 4 were prepared.

Each of the above three types of compounds was charged into an injection molding apparatus and injection-molded into a cavity of a die having a magnetic circuit attached to the injection molding apparatus, under the conditions of an injection temperature of 280° C., an injection pressure of 1000 kgf/cm$^2$ and an orientation magnetic field intensity of 4.1–4.2 kOe, to form a radially anisotropic bonded magnet of 13.6 mm in outer diameter×5 mm in inner diameter×10 mm in width for rotors.

Each of the resultant three types of bonded magnets for rotors was symmetrically provided with 10 magnetic poles under the conditions of saturating magnetic properties, and then measured with respect to a surface magnetic flux density at 20° C. The resultant surface magnetic flux density distribution was used to determine the maximum surface magnetic flux density of each magnetic pole, which was then averaged. The averaged values are shown in Table 5.

TABLE 5

| Compound | Magnet Powder No. | Max. Surface Magnetic Flux Density (G)* |
|---|---|---|
| Ex. 5 | No. 53 | 1370 |
| Ex. 6 | No. 33 | 1340 |
| Com. Ex. 3 | No. 63 | 1310 |

Note *Average value.

EXAMPLE 7

High-purity recycled iron oxide shown in Table 1 was mixed with predetermined amounts of $SiO_2$, CaO, $Al_2O_3$ and $Cr_2O_3$ to produce ferrite powder, whose magnetic properties were evaluated.

Ferrite powder having an average diameter of 1.05 μm was produced in the same manner as in EXAMPLE 4 except for changing the materials of a ball mill pot and steel balls to SUJ1 (C: 0.95–1.10 weight %, Si: 0.15–0.35 weight %, Mn: 0.50 weight % or less, Cr: 0.90–1.20 weight %, P: 0.025 weight % or less, S: 0.025 weight % or less), setting a peripheral speed at 0.5 m/second, and carrying out immersion in water, drying and sieving in a clean room after a heat treatment. A bonded magnets was produced in the same manner as in EXAMPLE 4 to measure magnetic properties thereof. The results are shown as Sample No. 71 in Table 6. In this ferrite powder for bonded magnets, $\Delta SiO_2$=0.062 weight %, and $\Delta Cr_2O_3$=0.006 weight %.

Trace amounts of $SiO_2$ and $Cr_2O_3$ were added at the time of fine pulverization of Sample No. 71 by dry ball milling, to produce ferrite powder having an average diameter of 1.05–1.06 μm, with the amount calculated as ($SiO_2$+CaO) and the amount calculated as ($Al_2O_3$+$Cr_2O_3$) finally adjusted as shown in Table 6. Bonded magnets obtained by using each ferrite powder were measured with respect to magnetic properties in the same manner as above. The results are shown as Sample Nos. 72–75 in Table 6.

Comparative Example 4

Trace amounts of $SiO_2$ and $Cr_2O_3$ were added at the time of fine pulverization of Sample No. 71 by dry ball milling, to produce ferrite powder having an average diameter of 1.06 μm, with the amount calculated as ($SiO_2$+Ca) and the amount calculated as ($Al_2O_3$+$Cr_2O_3$) finally adjusted as shown Table 6. Bonded magnets were produced by using the above ferrite powder in the same manner as in EXAMPLE 7 to measure magnetic properties thereof. The results are shown as Sample Nos. 81 and 82 in Table 6.

TABLE 6

| No. | Sample No. | $SiO_2$ + CaO (weight %) | $Al_2O_3$ + $Cr_2O_3$ (weight %) | Br (G) | iHc (Oe) |
|---|---|---|---|---|---|
| Ex. 7 | 71 | 0.086 | 0.077 | 2740 | 4460 |
|  | 72 | 0.165 | 0.098 | 2710 | 4520 |
|  | 73 | 0.198 | 0.125 | 2670 | 4540 |
|  | 74 | 0.128 | 0.105 | 2690 | 4530 |
|  | 75 | 0.194 | 0.095 | 2680 | 4510 |
| Ex. 4 | 32 | 0.133 | 0.082 | 2720 | 4510 |
| Com. Ex. 4 | 81 | 0.246 | 0.083 | 2630 | 4410 |
|  | 82 | 0.134 | 0.166 | 2610 | 4590 |
| Com. Ex. 2 | 42 | 0.133 | 0.080 | 2630 | 2960 |

Table 6 showed that when the value of ($SiO_2$+CaO) was 0.2 weight % or less, and when the value of ($Al_2O_3$+$Cr_2O_3$) was 0.13 weight % or less (Sample Nos. 71–75), higher Br was obtained than Sample No. 42. Particularly when the value of ($SiO_2$+CaO) was 0.15 weight % or less, and when the value of ($Al_2O_3$+$Cr_2O_3$) was 0.1 weight % or less, Br exceeded 2700 G. On the other hand, Sample No. 81 having ($SiO_2$+CaO) exceeding 0.2 weight %, and Sample No. 82 having ($Al_2O_3$+$Cr_2O_3$) exceeding 0.13 weight % showed lower Br than Sample No. 42.

As a result of considering the variation of $\Delta SiO_2$, $\Delta Cr_2O_3$, ($SiO_2$+CaO) and ($Al_2O_3$+$Cr_2O_3$) shown in Tables 3 and 6, and the purity of recycled iron oxide shown in Table 1, it has been found that to achieve high Br, the total of a Si content calculated as $SiO_2$ and a Ca content calculated as CaO is preferably 0.06 weight % or less, more preferably 0.05 weight % or less, particularly preferably 0.04 weight % or less, and the total of an Al content calculated as $Al_2O_3$ and a Cr content calculated as $Cr_2O_3$ is preferably 0.1 weight % or less, more preferably 0.09 weight % or less, particularly preferably 0.08 weight % or less in the iron oxide used.

EXAMPLE 8

Comparative Example 5

The coarse powder produced in EXAMPLE 5 was subjected to fine pulverization by a wet attritor. The concentration of a slurry was an initial slurry concentration calculated from the weight $W_1$ (kg) of coarse ferrite powder and the weight $W_2$ (kg) of water used, by the equation of [$W_1/(W_1+W_2)$]×100 (%). After fine pulverization, ferrite powder for bonded magnets having an average diameter shown in Table 7 was produced in the same manner as in EXAMPLE 4 to evaluate the properties of the resultant bonded magnets. Br and iHc of each bonded magnet measured at 20° C. are shown in Table 7. The fine pulverization of Sample No. 523 by an attritor only achieved fine powder of 1.17 μm, because of high slurry concentration. It has been found that when the initial slurry concentration was 66 weight % or more, it is difficult to carry out pulverization to an average diameter of 1.5 μm or less, resulting in a slurry containing much coarse powder.

TABLE 7

| No. | Sample No. | Fine Pulverization Conditions | Average Diameter (μm) | Br (G) | iHc (Oe) |
|---|---|---|---|---|---|
| Ex. 5 | 52 | Dry ball milling | 1.05 | 2760 | 3470 |
| Ex. 8 | 521 | Wet attritor Slurry conc. 60 wt. % | 1.04 | 2730 | 3480 |
|  | 522 | Wet attritor Slurry conc. 62 wt. % | 1.06 | 2740 | 3460 |
|  | 523 | Wet attritor Slurry conc. 65 wt. % | 1.17 | 2690 | 3180 |
| Com. Ex. 5 | 531 | Wet attritor Slurry conc. 55 wt. % | 1.05 | 2650 | 3440 |

It has been found from Table 7 that when the initial slurry concentration at the time of fine pulverization by a wet attritor is 60–65 weight %, high Br substantially corresponding to that obtained by dry ball milling can be obtained.

EXAMPLE 9

Comparative Example 6

Dry ball-milled fine powder having an average diameter of 1 μm in EXAMPLE 4 was formed to ferrite powder for bonded magnets (average diameter: 1.05–1.10 μm) in the same manner as in EXAMPLE 4 except for carrying out a heat treatment under the conditions shown in Table 8, and the properties of the resultant bonded magnets were evaluated. The results are shown in Table 8.

TABLE 8

| No. | Sample No. | Heat Treatment Conditions (° C. × hr.) | Br (G) | iHc (Oe) |
|---|---|---|---|---|
| Ex. 9 | 621 | 750 × 0.5 | 2760 | 2310 |
|  | 622 | 750 × 3 | 2750 | 2830 |
|  | 623 | 800 × 2 | 2740 | 3090 |
|  | 624 | 850 × 1 | 2720 | 3480 |
|  | 625 | 900 × 2.5 | 2660 | 4150 |
|  | 626 | 950 × 3 | 2580 | 4650 |
| Com. Ex. 6 | 631 | 750 × 0.3 | 2760 | 2120 |
|  | 632 | 1000 × 0.2 | 2570 | 2590 |

It has been found from Table 8 that the heat treatment conditions are preferably 750–950° C.×0.5–3 hours. When a heat treatment was carried out at 750–800° C. for over 3 hours, the saturation of iHc was observed. Agglomeration was observed by heating nearly under the conditions of 1000° C.×0.2 hours, resulting in drastic decrease in Br.

EXAMPLE 10

Comparative Example 7

The same heat-treated ferrite powder as Sample No. 52 (EXAMPLE 5) in Table 4 was subjected to wet disintegration under the conditions shown Table 9, and ferrite powder for bonded magnets having an average diameter of 1.05–1.06 μm was produced in the same manner as in EXAMPLE 5 to evaluate magnetic properties. The results are shown in Table 9.

TABLE 9

| No. | Sample No. | Wet Disintegration Conditions | Br (G) | iHc (Oe) |
|---|---|---|---|---|
| Ex. 5 | 52 | Immersion in water | 2760 | 3470 |
| Ex. 10 | 721 | Immersion in alcohol* | 2730 | 3460 |
|  | 722 | Immersion in water + Agitation in mixer (1 min.) | 2770 | 3310 |
|  | 723 | Immersion in water + Pulverization by attritor (30 sec.) | 2770 | 2940 |
| Com. Ex. 7 | 731 | — | 2710 | 3480 |

Note *Isopropyl alcohol.

It has been found from Table 9 that when immersion in water, immersion in isopropyl alcohol, and agitation in water by a Henschel mixer (1 minute) or pulverization in water by an attritor (30 seconds) are carried out after the heat treatment, Br is improved. By this wet disintegration, $\Delta SiO_2$ became less than 0.02 weight %, and $\Delta Cr_2O_3$ became less than 0.001 weight %.

EXAMPLE 11

Comparative Example 8

To produce magnet roll for copiers from ferrite powder, compounds A–E having the following compositions were prepared.

The formulations of the compounds A–E were 91.5 parts by weight of ferrite powder for bonded magnets, 6.2 parts by weight of EEA (MB-870), 1 part by weight of a dispersant (DH-37), 0.5 parts by weight of a lubricant (Slipacks E), and 0.8 parts by weight of silicone oil (KF968, available from Shin-etsu Chemical Co., Ltd.). The other conditions were the same as in EXAMPLE 4 to produce each compound.

(a) Compound A

A compound obtained by mixing magnetic powder of Sample No. 33 (EXAMPLE 4) in Table 3 with EEA.

(b) Compound B

A compound obtained by mixing ferrite powder having an average diameter of 1.14 μm produced under the same conditions as in EXAMPLE 4 except for using La-Co-Zn coarse powder of Sample No. 6 in Table 2 with EEA.

(c) Compound C

La-Zn coarse powder of Sample No. 7 in Table 2 was finely pulverized by a wet attritor (solvent: water) to an average diameter of 0.95 μm. The resultant slurry was wet-molded in a magnetic field of 12 kOe to produce a green body, which was then dried, disintegrated by a jaw crusher and sieved to provide molding powder having an average diameter of 2.5 μm. Next, a heat treatment was carried out at 830° C. for 3 hours, and then immersion in water, drying, and disintegration by sieving were carried out in the same manner as in EXAMPLE 4 to provide anisotropic granulated powder. The compound C is an EEA compound containing such granulated powder.

(d) Compound D

The compound D is an EEA compound containing anisotropic granulated powder having an average diameter of 3 μm. This anisotropic granulated powder was produced as follows. First, La-Co coarse powder of Sample No. 3 in Table 1 was finely pulverized by a wet attritor (solvent: water) to an average diameter of 0.90 μm. The resultant slurry was wet-molded in a magnetic field of 10 kOe to produce a green body. After demagnetization, the green body was heat at 100° C. or lower in the air to remove water and then cooled. After disintegration by a jaw crusher, sieving was carried out to provide powder having an average diameter of more than 2 μm and 15 μm or less. Next, a heat treatment was carried out at 750–1000° C. for 1 hour, and then immersion in water, drying, and disintegration by sieving were carried out in the same manner as in EXAMPLE 4 to provide anisotropic granulated powder.

Figure 3:
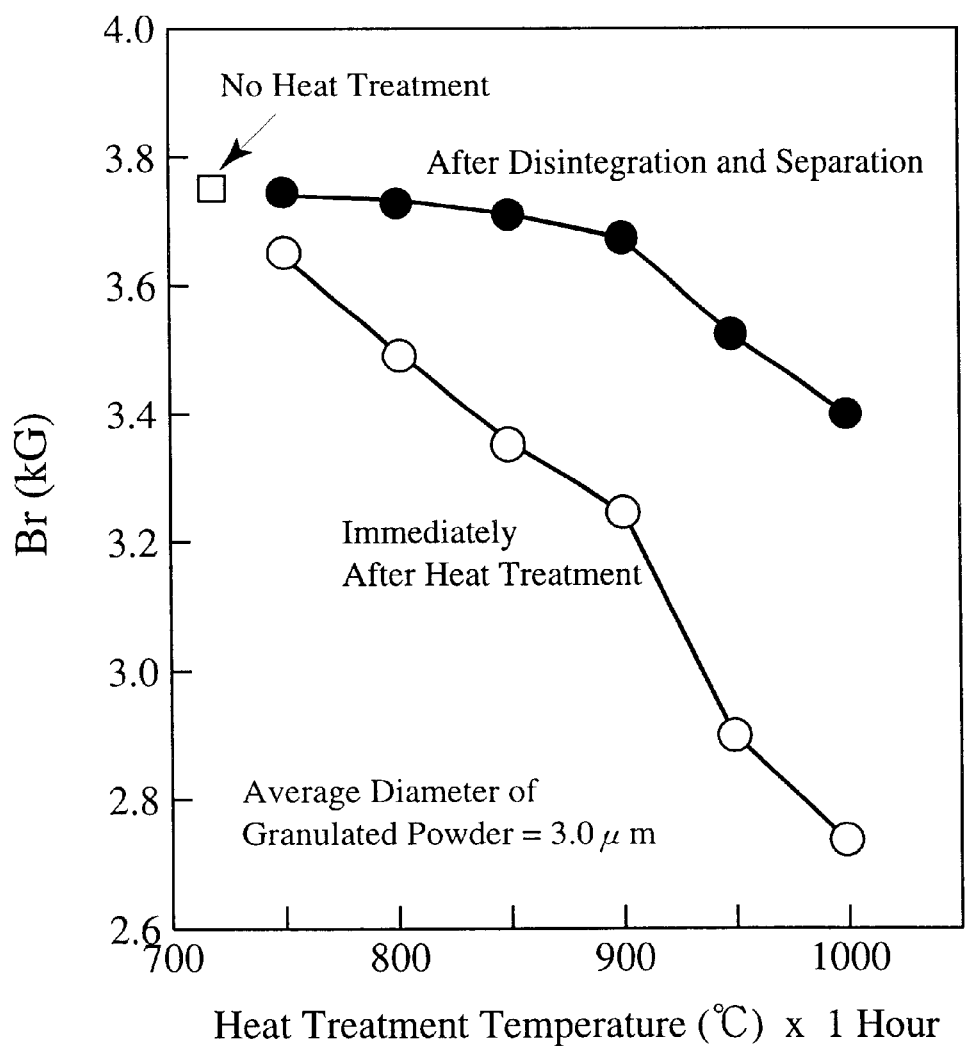
FIG. 3 is a graph showing one example of the correlation between a heat treatment temperature and Br in the ferrite powders of the present invention.
Figure 4:
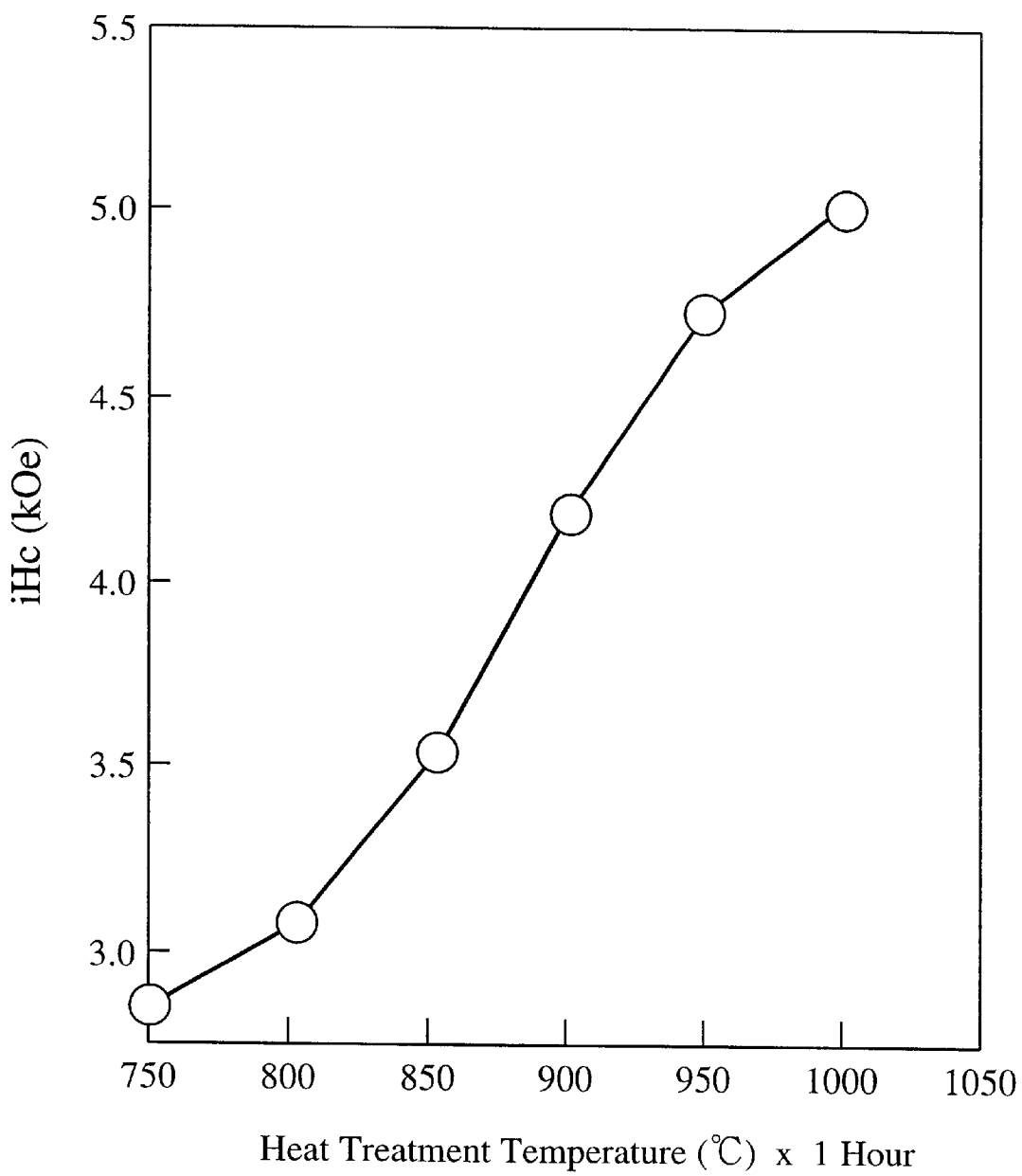
FIG. 4 is a graph showing one example of the correlation between a heat treatment temperature and iHc in the ferrite powders of the present invention.

A fraction separated from the resultant anisotropic granulated powder, which had an average diameter of 3 μm, was measured with respect to magnetic properties by VSM. Each anisotropic granulated powder and wax at a predetermined ratio and at a constant total weight were charged into a holder of VSM and sealed. Thereafter, while applying a parallel magnetic field of 5 kOe, VSM was heated to melt the wax and then cooled to solidify the wax in a state that magnetic powder was oriented. In this state, a demagnetization curve was obtained at room temperature to determine Br and iHc corrected to a state of 100-% magnetic powder. The results are shown in FIGS. 3 and 4. When the heat treatment temperature was selected to 750–950° C., Br of 3.5–3.75 kG and iHc of 2.85–4.75 kOe were obtained. Incidentally, when the average diameter exceeded 10 μm, about 5% decrease in Br was observed when compared at the same heat treatment temperature in FIG. 3. The EEA compound was prepared by using the anisotropic granulated powder having an average diameter of 3 μm subjected to a heat treatment at 800° C. for 1 hour.

(e) Compound E

This is an EEA compound of COMPARATIVE EXAMPLE 2 containing the magnetic powder of Sample No. 43 in Table 3.

Each of the compounds A–E was charged into a molding apparatus 6 shown in FIGS. 5 and 6, and made anisotropic by passing through an orientation die 7 mounted to a tip end of the molding apparatus 6. The resultant cylindrical molded article was cooled, demagnetized and then cut to a predetermined length. After a shaft 12 was fixed into a center hole of this integral molded article (outer diameter: 18 mm, inner diameter: 8 mm, length: 300 mm), unsymmetrical 4 magnetic poles were formed on a surface of the cylindrical bonded magnet. It was then assembled in a sleeve 2 made of an aluminum alloy having an outer diameter of 20 mm to obtain a magnet roll 1 having a radially anisotropic bonded magnet shown in FIG. 7.

Table 10 shows the measurement results of a surface magnetic flux density ($B_0$) on a surface of the sleeve 2 at a center point in a longitudinal direction immediately above an $N_1$ pole. A gap between an outer surface of the cylindrical anisotropic bonded magnet 11 and an outer surface of the sleeve 2 was 1.0 mm.

It has been found from Table 10 that the use of the compounds A–D improves the surface magnetic flux density on the sleeve 2 of the magnet roll 1. The compounds C and D are good in moldability, showing molding efficiency (number of cylindrical bonded magnets 11 formed per unit time) 5–10% higher than the compounds A, B and E.

Next, the cylindrical, radially anisotropic, bonded magnet formed from the compound A was cut to provide test pieces for the measurement of magnetic properties at 20° C. Br was 3030 G.

The above cylindrical bonded magnet 11 is preferably in the form of a cylinder having an outer diameter D=10–60 mm, a length L=200–350 mm, and L/D≧5, and it has preferably a small diameter of D=10–30 mm, particularly D=10–20 mm and L/D≧5 for small copiers or printers.

TABLE 10

| No. | Compound | $B_0$ (G) on Sleeve |
|---|---|---|
| Ex. 11 | A (La—Co) | 960 |
|  | B (La—Co—Zn) | 980 |
|  | C (La—Zn, granulated) | 945 |
|  | D (La—Co, granulated) | 940 |
| Com. Ex. 8 | E (conventional composition) | 920 |

Figure 8:
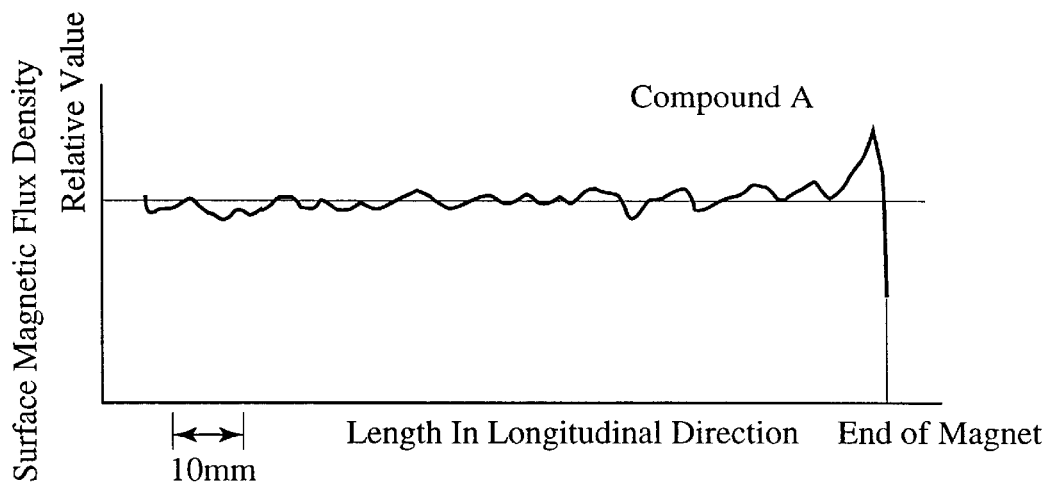
FIG. 8(a) is a graph showing a surface magnetic flux density distribution in a longitudinal direction of a cylindrical bonded magnet for a magnet roll obtained by using a compound A.
FIG. 8(b) is a graph showing a surface magnetic flux density distribution in a longitudinal direction of a cylindrical bonded magnet for a magnet roll obtained by using a compound D.
Figure 8:
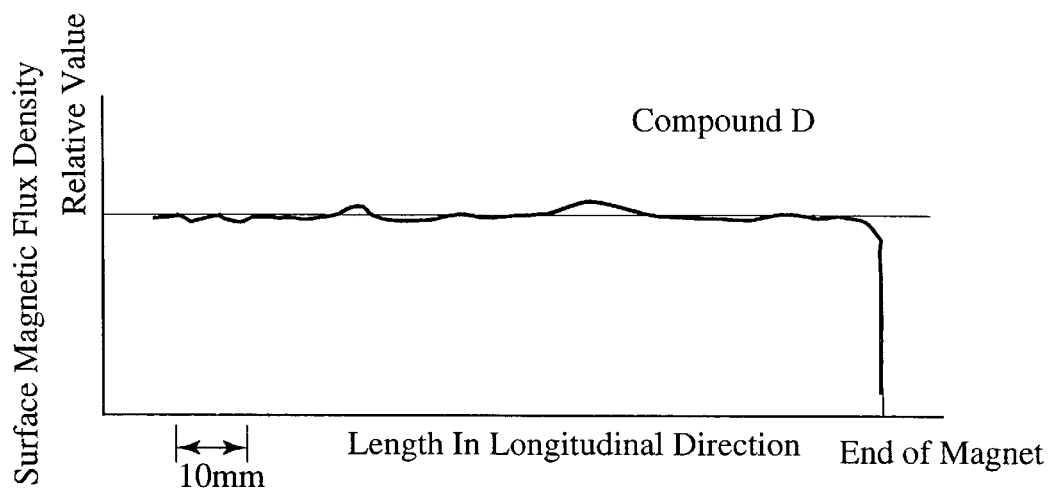

Next, the cylindrical bonded magnets formed from the compounds A and D were measured with respect to a surface magnetic flux density on an outer surface along an $N_1$ pole in a longitudinal direction. The results are shown in FIGS. 8(a) and (b). As is clear from FIGS. 8(a) and (b), the cylindrical bonded magnet formed from the compound D had smaller unevenness in a surface magnetic flux density in a longitudinal direction than the cylindrical bonded magnet formed from the compound A. This verifies that by using the anisotropic granulated powder, bonded magnets having improved evenness in a surface magnetic flux density can be obtained.

The above EXAMPLES show the case of radial anisotropy, an extrusion molding method imparting polar anisotropy may be selected. The shape of the bonded magnet is not limited to a hollow cylinder, but any shape including solid cylinder may be adopted.

Though the above EXAMPLES show Sr ferrite powder containing the R element and the M element, it is expected that Ba ferrite powder containing the R element and the M element also has higher Br (or higher Br and iHc) than those of the conventional Sr and/or Ba ferrite powder.

Though the above EXAMPLES show injection molding and extrusion molding, compression molding is also applicable to produce bonded magnets having high Br and $(BH)_{max}$.

APPLICATIONS IN INDUSTRY

High-performance ferrite powder for bonded magnets having higher Br (or higher Br and iHc) than the conventional Sr and/or Ba ferrite powder for bonded magnets can be obtained by adjusting to the above basic composition and by controlling the amounts of impurities of Si, Ca, Al and Cr. The bonded magnets obtained from such ferrite powder are advantageous over the conventional bonded magnets because of higher iHc and at least equivalent Br, as well as the reduced unevenness of a surface magnetic flux density.

Particularly when the bonded magnet of the present invention is used, the resultant magnet roll can be provided with a lot of magnetic poles showing radial or polar anisotropy with reduced unevenness in a magnetic flux density in a longitudinal direction. The bonded magnet also has a good dimension stability even when it is produced by molding in a magnetic field.

What is claimed is:

1. A ferrite powder for bonded magnets having a substantially magnetoplumbite-type crystal structure, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one rare earth element including Y, La being indispensable; M is Co, or Co and Zn; and x, y and n are numbers meeting the following conditions:

0.01≦x≦0.4, 0.005≦y≦0.04, and

5≦n≦6.

2. The ferrite powder for bonded magnets according to claim 1, wherein an average diameter of said ferrite powder for bonded magnets is 0.9–2μm.

3. The ferrite powder for bonded magnets according to claim 1, wherein said ferrite powder for bonded magnets comprises an anisotropic granulated powder having an average diameter of 2 μm.

4. A compound comprising a ferrite powder for bonded magnets and a binder, said ferrite powder for bonded magnets having a substantially magnetoplumbite-type crystal structure, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one rare earth element including Y, La being indispensable; M is Co, or Co and Zn; and x, y and n are numbers meeting the following conditions:

0.01≦x≦0.4, 0.005≦y≦0.04, and

5≦n≦6.

5. A bonded magnet comprising a ferrite powder for bonded magnets, which is obtained by heat-treating at 750–950° C., and a binder, said ferrite powder for bonded magnets having a substantially magnetoplumbite-type crystal structure, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one of rare earth elements including Y, La being indispensable; M is Co, or Co and Zn; and x, y and n are numbers meeting the following conditions:

0.01≦x≦0.4, 0.005≦y≦0.04, and

5≦n≦6.

6. A bonded magnet comprising a ferrite powder for bonded magnets and a binder, having radial or polar anisotropy, said ferrite powder for bonded magnets having a substantially magnetoplumbite-type crystal structure, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one rare earth element including Y, La being indispensable; M is Co, or Co and Zn; and x, y and n are numbers meeting the following conditions:

0.01≦x≦0.4, 0.005≦y≦0.04, and

5≦n≦6.

7. A rotor obtained by using a bonded magnet comprising a ferrite powder for bonded magnets and a binder, having a radial or polar anisotropy, said ferrite powder for bonded magnets having a substantially magnetoplumbite-type crystal structure, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one rare earth element including Y, La being indispensable; M is Co, or Co and Zn; and x, y and n are numbers meeting the following conditions:

0.01≦x≦0.4, 0.005≦y≦0.04, and

5≦n≦6.

8. A magnet roll obtained by using a bonded magnet comprising a ferrite powder for bonded magnets and a binder, said ferrite powder for bonded magnets having a substantially magnetoplumbite-type crystal structure, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one rare earth element including Y, La being indispensable; M is Co, or Co and Zn; and x, y and n are numbers meeting the following conditions:

0.01≦x≦0.4, 0.005≦y≦0.04, and

5≦n≦6.

9. The magnet roll according to claim 8, wherein said bonded magnet is formed in the shape of an integral cylinder.

10. The magnet roll according to claim 8, wherein said bonded magnet is formed in the shape of a segment.

11. A ferrite powder for bonded magnets, which is obtained by heat-treating at 750–950° C., said ferrite powder for bonded magnets having a substantially magnetoplumbite-type crystal structure, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one rare earth element including Y, La being indispensable; M is Co, or Co and Zn; and x, y and n are numbers meeting the following conditions:

0.01≦x≦0.4, 0.005≦y≦0.04, and

5≦n≦6, thereby providing a ferrite powder having a coercivity (iHc) of 2.85 kOe or more.

12. The ferrite powder for bonded magnets according to claim 11, said ferrite powder having a residual magnetic flux density (Br) of 3.5–3.75 kG and a coercivity (iHc) of 2.85–4.75 kOe.

13. The ferrite powder for bonded magnets according to claim 11, said ferrite powder having a magnetization ($\sigma_{4kOe}$) of 5 7.6–63.5 emu/g.

14. A bonded magnet comprising a ferrite powder for bonded magnets and a binder, having a radial anisotropy, said ferrite powder for bonded magnets having a substantially magnetoplumbite-type crystal structure, said ferrite powder having a basic composition represented by the following general formula:

$(A_{1-x}R_x)O \cdot n[(Fe_{1-y}M_y)_2O_3]$ by atomic ratio, wherein A is Sr and/or Ba; R is at least one rare earth element including Y, La being indispensable; M is Co, or Co and Zn; and x, y and n are numbers meeting the following conditions:

0.01≦x≦0.4, 0.005≦y≦0.04, and

5≦n≦6, and said bonded magnets being molded by an injection molding apparatus.

* * * * *